(12) United States Patent
George et al.

(10) Patent No.: US 6,259,561 B1
(45) Date of Patent: Jul. 10, 2001

(54) OPTICAL SYSTEM FOR DIFFUSING LIGHT

(75) Inventors: Nicholas George, Pittsford; Donald J. Schertler, Rochester, both of NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 09/277,425

(22) Filed: Mar. 26, 1999

(51) Int. Cl.[7] ............................... G02B 5/02; G02B 5/18

(52) U.S. Cl. ..................... 359/566; 359/569; 359/591; 359/599

(58) Field of Search .................. 359/567, 569, 359/574, 576, 599, 591, 592, 593, 594

(56) References Cited

U.S. PATENT DOCUMENTS

| | | | |
|---|---|---|---|
| 5,048,925 | * 9/1991 | Gerritsen et al. | 359/569 |
| 5,621,487 | * 4/1997 | Shirochi | 349/112 |
| 5,760,955 | * 6/1998 | Goldenberg et al. | 359/456 |
| 5,837,346 | 11/1998 | Langille et al. | 428/141 |

OTHER PUBLICATIONS

C.N. Kurtz, Transmittance Characteristics of Surface Diffusers and the Design of Nearly Band–Limited Binary Diffusers, Journal of the Optical Society of America, vol. 62, No. 8, pp. 982–989, 1972.

C.N. Kurtz, H.O. Hoadley, and J.J. DePalma, Design and synthesis of random phase diffusers, Journal of the Optical Society of America, vol. 63, No. 9, pp. 1080–1092, 1973.

Nicholas George and Atul Jain, Space and Wavelength Dependence of Speckle Intensity, Applied Physics, vol. 4, pp. 201–212, 1974.

Nicholas George, Atul Jain, and R.D.S. Melville, Jr., Experiments on the Space and Wavelength Dependence of Speckle, Applied Physics, vol. 7, pp. 157–169, 1975.

Karen J. Allardyce and Nicholas George, Diffraction analysis of rough reflective surfaces, Applied Optics, vol. 26, No. 12, pp. 2364–2375, 1987.

Lyle G. Shirley and Nicholas George, Diffuser radiation patterns over a large dynamic range. 1: Strong diffusers, Applied Optics, vol. 27, No. 9, pp. 1850–1861, 1988.

Nicholas George, Speckle at various planes in an optical system, Optical Engineering, vol. 25, No. 6, pp. 754–764, 1986.

Lyle G. Shirley and Nicholas George, Wide–angle diffuser transmission functions and far–zone speckle, Journal of the Optical Society of America A, vol. 4, No. 4, pp. 734–745, 1987.

E.W. Marchand, Diffraction effects with lenticular projection screens, Journal of the Optical Society of America, vol. 65, No. 2, pp. 139–145, 1975.

(List continued on next page.)

*Primary Examiner*—Jon Henry
(74) *Attorney, Agent, or Firm*—Kenneth J. Lukacher

(57) ABSTRACT

An improved optical system is provided for diffusing light uniformly over a wide angle, including, a diffractive element for diffracting light received by the system in multiple diffraction orders, and a diffusing element which diffuses the diffracted light. The diffractive element provides diffracted light having an angular distribution of intensities over the diffraction orders which is correlated to the power spectrum of the diffusing element such that the system produces a predetermined intensity distribution of diffused light. The diffraction period of the diffractive element is selected such that the angular separation between the zeroeth and first diffraction orders is approximately one-half the angular extent of the full-width-at-half-maximum of the power spectrum of the diffusing element. The strengths of the diffraction orders are selected such that the combination of diffused light from each diffractive order provides uniformity in the intensity of the diffused light from the system.

59 Claims, 21 Drawing Sheets

OTHER PUBLICATIONS

Michael D. Kirkpatrick and George Mihalakis, Projection Screens for High Definition Television, In Large–Screen–Projection, Avionic, and Helmet–Mounted Displays, SPIE vol. 1456, pp. 40–47, 1991.

Ralph Bradley, Jr. et al., Ultra–wide viewing angle rear projection television screen, IEEE Transactions on Consumer Electronics, vol. CE–31, No. 3, pp. 185–193, 1985.

Karl M. Jauch & H.P. Baltes, Coherence of radiation scattered by gratings covered by a diffuser Experimental evidence, Optica Acta, vol. 28, No. 8, pp. 1013–1015, 1981.

H.P. Baltes and A.M.J. Huiser, Coherent and incoherent grating reconstruction, Journal of the Optical Society of America, vol. 3, No. 8, pp. 1268–1275, 1986.

D. Newman and J.C. Dainty, Detection of gratings hidden by diffusers using intensity interferometry, Journal of the Optical Society of America, vol. 1, No. 4, pp. 403–411, 1984.

Henry P. Baltes, Speckle correlation and the detection of phase gratings hidden by diffusers, SPIE vol. 556 International Conference on Speckle, pp. 223–226, 1985.

E. Simova and M. Kavehrad, Light Shaping Diffusers for Indoor Wireless Infrared Communications via a Holographic Approach, Diffractive and Holographic Optics Technology III, I. Cindrich and S.H. Lee, ed., SPIE vol. 2689, pp. 284–291, 1996.

P.C. Clemmow, The Plane Wave Spectrum Representation of Elecromagnetic Fields, Pergamon Press, New York, pp. 11–38, 1966.

M.J. Beesley and J.G. Castledine, The Use of Photoresist as a Holographic Recording Medium, Applied Optics, vol. 9, No. 12, pp. 2720–2724, 1970.

R.A. Bartolini, Characteristics of Relief Phase Holograms Recorded in Photoresists, Applied Optics, vol. 13, No. 1, pp. 129–139, 1974.

Stewart Austin and F.T. Stone, Fabrication of thin periodic structures in photoresist: a model, Applied Optics, vol. 15, No. 4, pp. 1071–1074, 1976.

R.C. Enger and S.K. Case, High–frequency holographic transmission gratings in photoresist, Journal of the Optical Society of America, vol. 73, No. 9, pp. 1113–1118, 1983.

Sten Lindau, Controlling the Grove Depth of Holographic Gratings, Optical System Design, Analysis, and Production, P.J. Rogers and R.E. Fischer, eds., Proc. SPIE 399, pp. 323–328, 1983.

Miroslav Miler, Photoresist as a recording material for holographic elements, SPIE vol. 2108, pp. 2–8, 1993.

Lyle Gordon Shirley, Laser speckle from thin and cascaded diffusers, Ph.D. Thesis University of Rochester, The Institute of Optics, 1988.

* cited by examiner

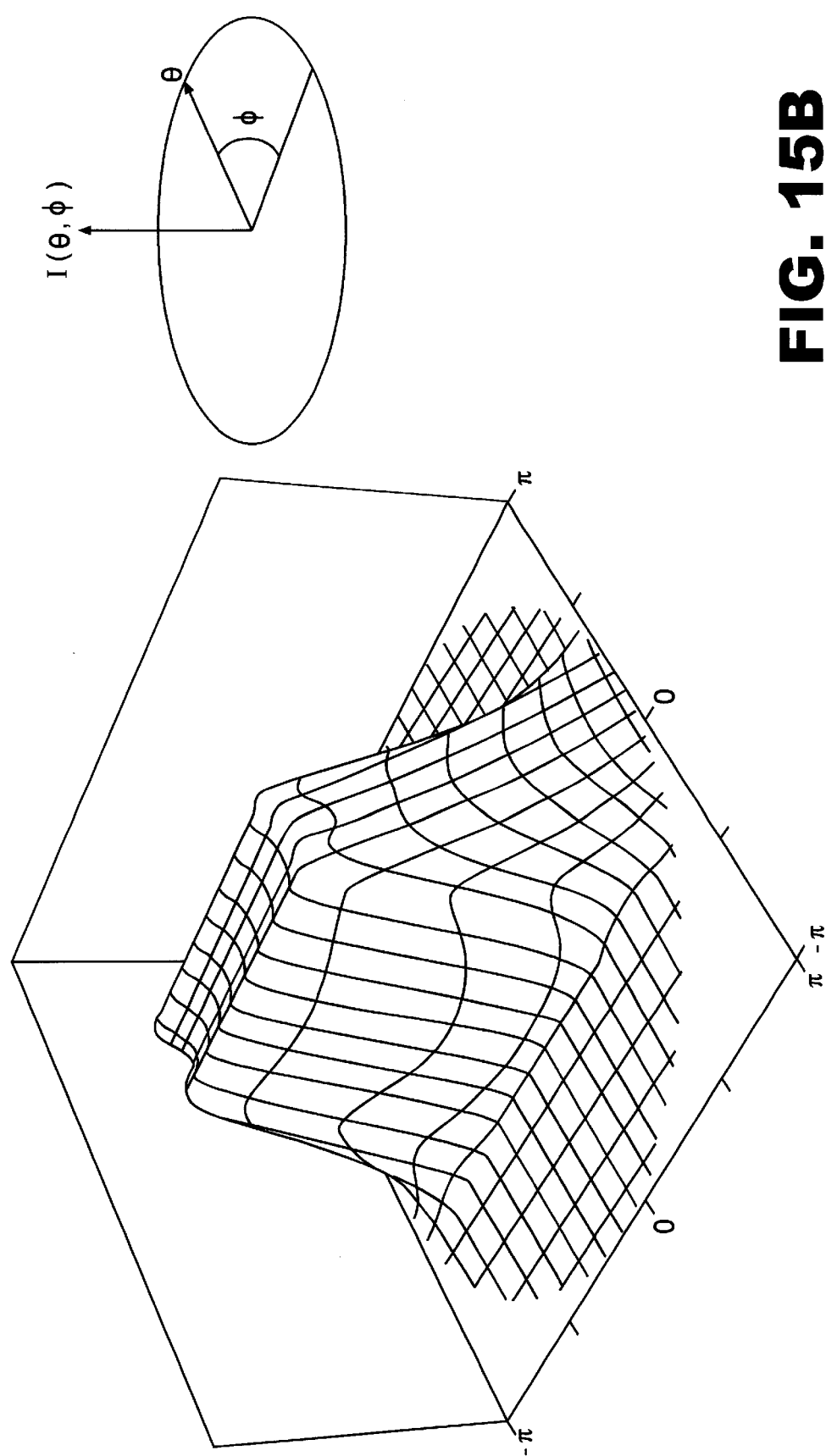

OPTICAL SYSTEM FOR DIFFUSING LIGHT

DESCRIPTION

1. Field of the Invention

The present invention relates to an optical system (and method) for diffusing light, and relates particularly to, an optical system having a diffractive element and a diffusing element, which diffuses light diffracted from the diffractive element. The invention is especially suitable for diffusing light for a projection television (TV) or display screen, or diffusing light for a window, skylight, light bulb or light tube, such that the diffused light has a uniform intensity distribution over a wide angle.

2. Background of the Invention

Optics for diffusing light is typically used for large screen projection TV's, and includes a lenticular array consisting of vertically oriented cylindrical lenslets formed in a plastic sheet. The array distributes the light horizontally by an angular amount determined by the numerical aperture of the individual lenslets. Typical commercially available screens with a lenticular array have poor efficiency, 30% or less, and have undesirable color banding and white and dark lines at the edges of the pattern due to the diffraction effect of the lenslet array. Often a two-sided lenticular screen is used for projection TV's having a black absorbing stripe between lenslets to increase the screen contrast and reduce ambient room-light reflections. One proposed design described in R. J. Bradley, J. F. Goldenberg and T. S. McKechnie, "Ultra-wide viewing angle rear projection television screen," IEEE Trans., Consum. or Electronics. CE-31, p.185–193 (1985), incorporates a complex lenticular surface, a bulk diffuser and black striping. The screen is reported to have a nearly uniform luminance pattern over a ±90° range giving rise to an intensity distribution that falls off as a cosine of the scattering angle. The bulk diffuser is used to spread the light vertically. In this design, like in the typical projection TV, the diffusing optics does not use diffraction in multiple diffraction orders to enhance the diffusing of light.

Diffusing of light is also used for skylights. Typically, the skylights have a clear window pane installed at roof level of a room followed by a deep well that is painted white. The deep well acts as a diffusing reflector to prevent direct sunlight from reaching the room. Often when large skylights are used, special shaped diffusing reflectors are installed, such as in the Musée d'Orsay in Paris, France. While diffusing reflectors are effective, they are expensive and unaesthetic. Accordingly, it would be desirable to diffuse light from a skylight without the need for a diffusing reflector.

Diffusing of light may also be provided by frosting of glass used for windows, or in the area of artificial light, by the frosting of light bulbs. However, such light diffused through frosted glass is often not as uniform as desired.

The present invention relates to an optical system for diffusing light for use in illumination or display applications having a cascade of a diffractive element, such as a grating, and a thin diffusing element, referred to as a diffuser. Although cascades of a grating and a diffuser have been proposed in other areas, they have been limited to the analysis of coherence properties, such as discussed in K. M. Jauch and H. P. Baltes, "Coherence of radiation scattered by gratings covered by a diffuser. Experimental evidence," Optica Acta 28, 1013–1015 (1981), detecting gratings hidden by diffusers, such as discussed in D. Newman and J. C. Dainty, "Detection of gratings hidden by diffusers using intensity interferometry," J.Opt.Soc.Am. A 1, p. 403–411 (1984), or for use with wireless communication systems, such as discussed in E. Simova and M. Kavehrad, "Light shaping diffusers for indoor wireless infrared communications via a holographic approach," in Diffractive and Holographic Optics Technology III, I. Cindrich and S. H. Lee, ed., Proc. SPIE 2689, 284–291 (1996). The prior art cascades of a grating and a diffuser do not produce over a wide angle the uniform diffused light needed for illumination and display applications.

SUMMARY OF THE INVENTION

It is the principal object of the present invention to provide an improved optical system for diffusing light uniformly over a wide angle.

Another object of the present invention is to provide an improved optical system for diffusing light for projection TV's with greater efficiency than the prior art lenticular screens, and can easily replace such lenticular screens.

A further object of the present invention is to provide an improved optical system for diffusing light which can be used as, or in combination with, windows or skylights, without requiring diffusing reflectors.

Yet a further object of the present invention is to provide an improved optical system for diffusing light produced by a display screen.

Another object of the present invention is to provide an improved optical system for diffusing light which utilizes a diffractive element for providing multiple diffraction orders.

A still further object of the present invention is to provide an improved optical system for diffusing light which can be placed on two sides of a single sheet of light transmissive material.

Briefly described, the optical system embodying the present invention includes a diffractive element for diffracting light received by the system in multiple diffraction orders, and a diffusing element which diffuses the diffracted light from the first optical element in accordance with the diffraction orders to provide diffused light.

The diffractive element provides diffracted light to the diffusing element having an intensity distribution in the form of a number of individual beams, termed diffraction orders, that are spaced by an angular separation determined by the diffraction period of the diffractive element and the illuminating wavelength or wavelengths. The intensity distribution of the diffracted light is correlated with the angular dependent intensity of scattered light provided by the diffusing element, which may be called the power spectrum of diffusion, such that the combination of the diffused light from each diffraction order provides a substantially uniform intensity over an observation zone or plane.

The correlation of the intensity distribution of the diffracted light to the diffusing element is such that the angular separation between the zeroeth diffraction order and the first diffraction order is approximately equal to one-half the angular width of the power spectrum of the diffusing element. The angular width represents the full-width-at-half-maximum of the power spectrum of the diffusing element. The strengths (intensity) of the diffraction orders are selected such that the combination (sum) of the diffused light from each diffraction order provides uniformity in the intensity of the diffused light from the system in the far field. Thus, the intensity distribution of the diffused light in the far field represents a superposition of the individual intensity distributions from the diffusing element when illuminated at the angle provided by each diffraction order of the diffracted light weighted by the strengths of the diffraction orders. The weights of the strength of the diffraction orders are such that the diffused light from each diffraction order contributes to provide a uniform combined intensity distribution of diffused light over a wide angle, such as between 45 and 100 degrees.

The diffractive element may represent a diffraction grating. The structure of the diffraction grating may be one-dimensional or two-dimensional. The diffusing element may have a surface which provides scattering at small angles (less than 10 degrees) of light incident on the diffusing element. The diffractive and diffusing elements may either be spaced a distance from each other, or integrated on a single body, such as on the two sides of a sheet of light transmissive material.

The combination of diffusing and diffractive elements can provide diffused light having a uniform intensity distribution over a wide angle in one direction with a much smaller angle in the other, which is desirable for a projection TV or the like. The combination of diffusing and diffractive elements can also provide diffused soft-light, such as for window or skylight, by selection of an appropriate grating structure for the diffractive element. The present invention is also applicable to other illuminating or display applications to provide high efficiency diffusing of light, such as display screens, microfilm viewers, greenhouses, illuminating signs, billboards, light bulbs and light tubes.

BRIEF DESCRIPTION OF THE DRAWINGS

The foregoing objects, features and advantages of the invention will become more apparent from a reading of the following description in connection with the accompanying drawings in which.

FIGS. 1A and 1B are optical diagrams of the system according to the present invention having a diffractive element (in the form of a diffraction grating on the surface thereof) and a diffusing element (referred to as a diffuser), in which FIG. 1A shows the diffraction grating oriented to face the diffuser, and FIG. 1B shows the diffraction grating oriented to face the illumination;

FIG. 15B is a graph illustrating the scattering pattern of the diffused light in an example of the system of FIG. 14A showing an asymmetric pattern with a 90° span in the horizontal direction and a 30° in the vertical direction;

DETAILED DESCRIPTION OF THE INVENTION

Figure 1A:
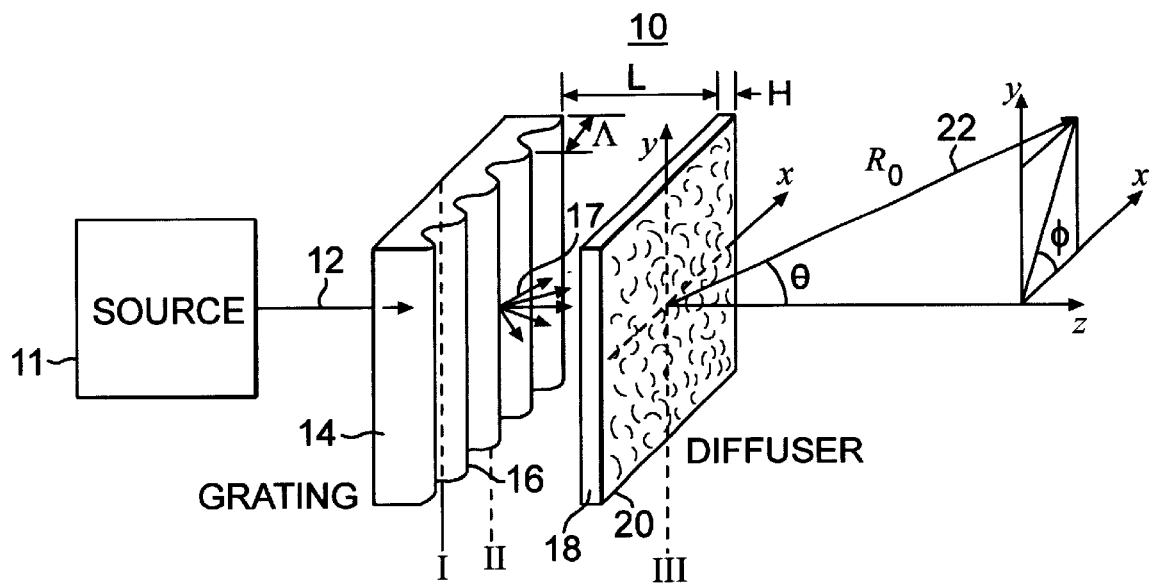
Figure 1B:
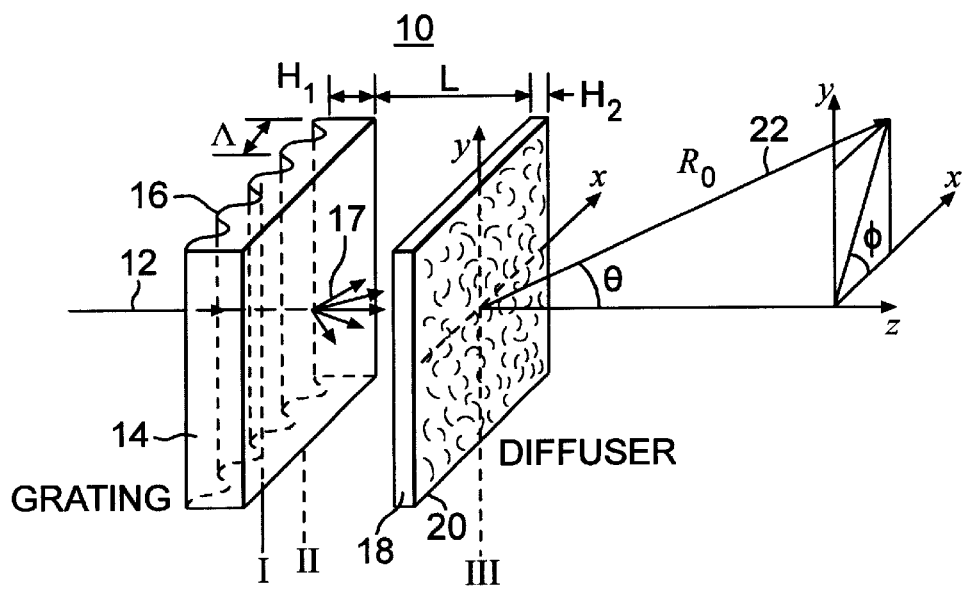

Referring to FIGS. 1A and 1B, the optical system 10 for diffusing light 12 is shown. System 10 includes a first optical element 14 for diffracting light and a second optical element 18 for diffusing light. The diffractive element 14 may represent a periodic diffraction grating. The diffusing element 18 has a rough surface 20 providing a narrow scattering angle for the diffusing of light. The diffusing element 18 is illuminated at multiple angles simultaneously by the diffracted light 17 from the diffractive element 14, such that the combination of the intensity patterns of scattered light produced by the diffusing element at each diffraction order of the diffracted light provides a substantially uniform intensity of diffused light 22. The intensity distribution of the diffused light 22 in the far field is a superposition of the individual intensity patterns weighted by the strengths of the diffraction orders. The combination of the diffractive element 14 and diffusing element 18 is referred to herein as a cascade.

In FIG. 1A, the diffractive element 14 is oriented such that the surface 16 of the diffractive element, which presents a grating, faces the diffusing element 18. In FIG. 1B, system 10 is shown in which the diffractive element 14 is oriented such that the surface 16 faces the light 12 received by the system. Depending on the application of the optical system 10, the source of light 12 may be sunlight, illumination from a screen of a display or projection television, an artificial light source, or any other light where diffusion (or scattering) is desired. For purposes of illustration, the source of light 12 is shown as block 11, which maybe part of system 10 or separate from the system.

Figure 1C:
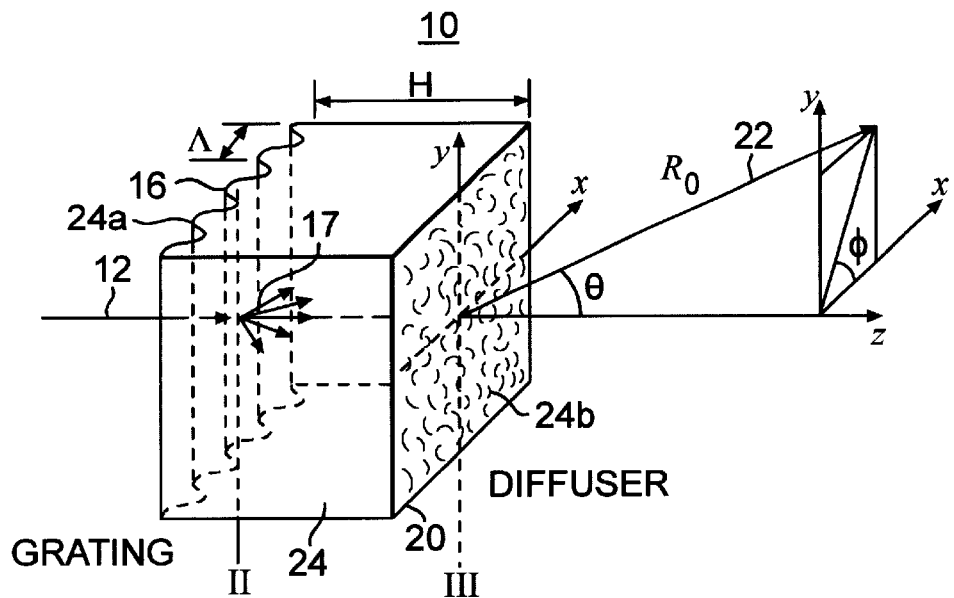
FIG. 1C is an optical diagram of the system according to the present invention in which the diffraction grating and diffuser are part of a single body.

Diffractive and diffusing elements 14 and 18 may be on separate bodies as shown in FIGS. 1A and 1B, or the system 10 may be integrated on a single body 24, as shown in FIG. 1C. Body 24 may represent a medium such as a sheet of plastic, glass or metal in which one surface 24a provides the diffractive element 14 and the other surface 24b provides the diffusing element 18. Such a sheet can readily replace the lenticular array screen commonly used in projection televisions, or be used as, or in combination with, a window or skylight. The profile structure of the grating of the diffractive element may be linear or cylindrical, or circular symmetric, depending on the desired spatial distribution of the diffused light.

The system 10 produces diffused light which is scattered substantially uniformly in an angular range selected by the characteristics of the diffraction period and the angular orders of diffraction of the diffractive element 14, and the scattering properties of the diffusing element 18, for the wavelength or wavelengths of light to be diffused, as described later below. When the grating structure of the diffractive element is linear or cylindrical, similar to lenticular optics, the scattering pattern produced by the system can be spread fan-like over a wide angle in one-plane, such as between 65 and 100 degrees, and a smaller range in the other plane, such as between 15 and 50 degrees. The diffused light from the system may be substantially uniform within this angular range, such as within ±1 db. The system 10 can diffuse single or multiple wavelengths of light, and can have an optical efficiency of up to 95% depending on the wavelength(s) and the optical characteristics of the diffractive and diffusing elements 14 and 18.

Figure 14A:
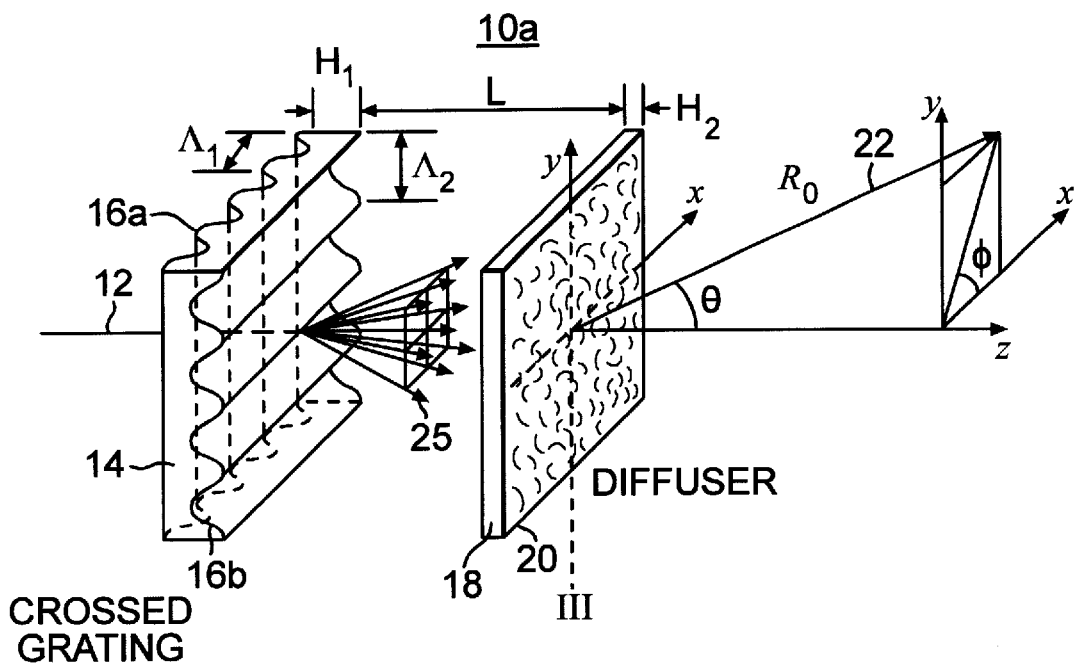
FIG. 14A is an optical diagram of the system according to the present invention having two diffractive elements, in the form of crossed gratings, and a diffusing element.
Figure 14B:
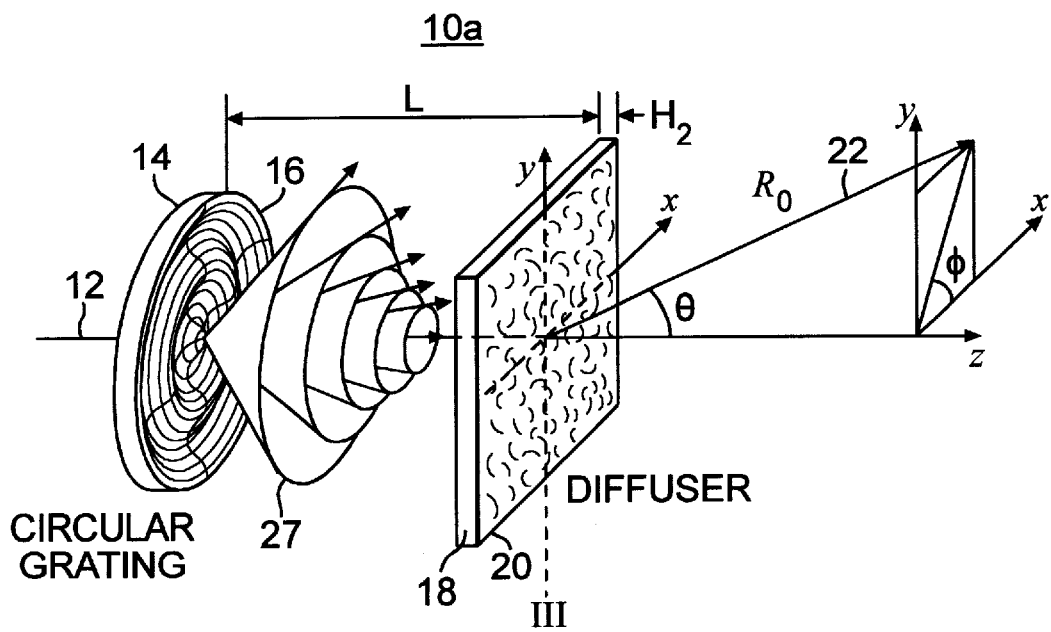
FIG. 14B is an optical diagram of the system according to the present invention having a diffractive element and a diffusing element in which the diffractive element is a circular grating.
Figure 15A:
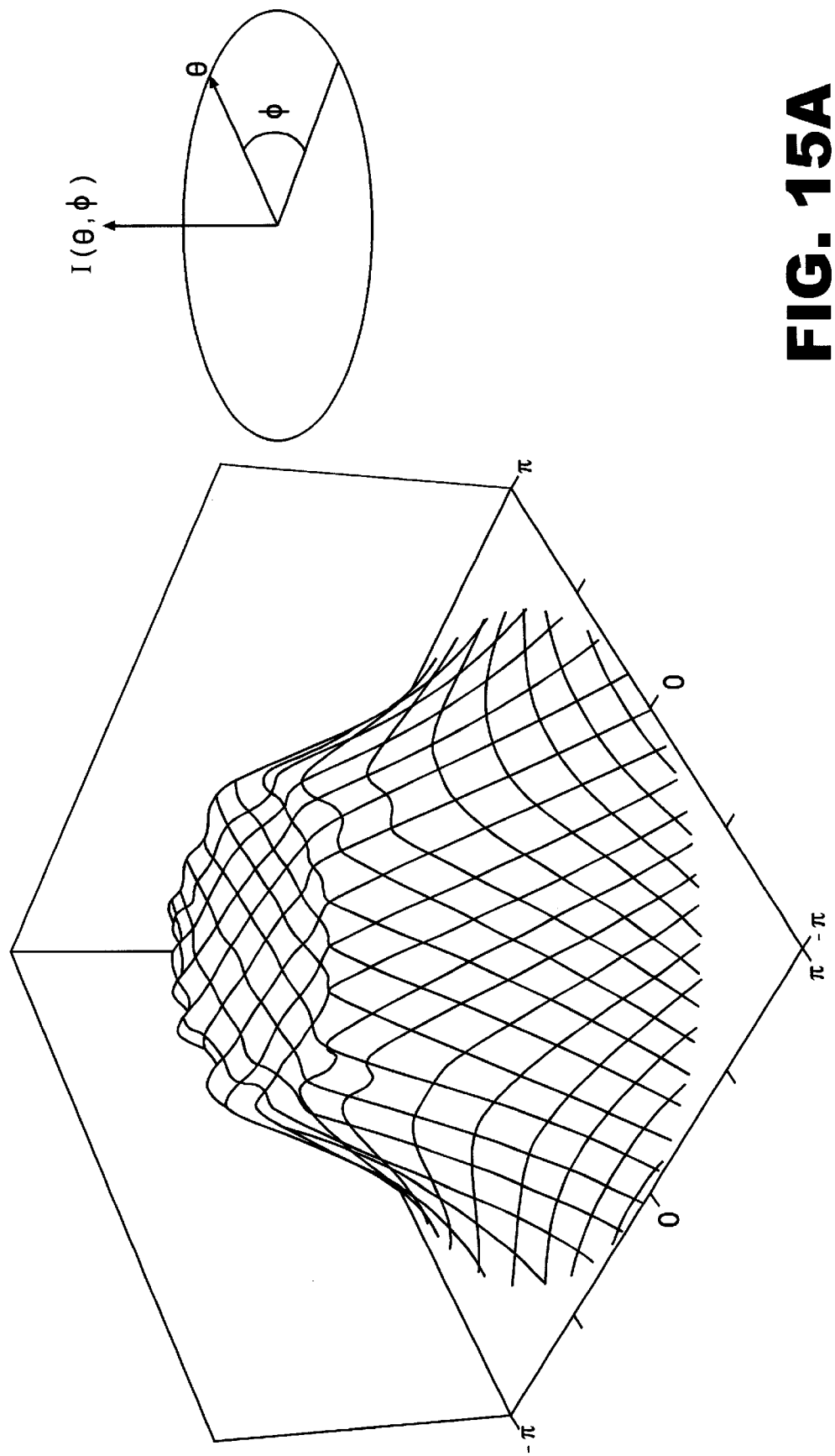
FIG. 15A is a graph illustrating the scattering pattern of the diffused light in an example of the system of FIG. 14A showing a circular symmetric pattern over a 90° span.

In system 10 of FIGS. 1A–1C, the grating structure shown for diffractive element 14 is one-dimensional such that the illumination from the system is substantially uniform over a wide angle in one-dimension. A circularly symmetric or other two-dimensionally tailored uniform illumination can also be produced using a diffractive element 14 having a two-dimensional grating structure as shown in the system 10a of FIGS. 14A and 14B. System 10a is similar to system 10, but incorporates an element 14 with a two-dimensional grating structure. The two-dimensional structure, for example, may be a crossed grating structure, as shown in FIG. 14A, or a circular grating structure, as shown in FIG. 14B. The crossed grating diffractive element of FIG. 14A has corrugations that run perpendicular to one another to produce diffracted light 25 having diffraction orders in a two-dimensional array. The angular spread of these orders is determined by the respective grating period of the diffractive element in each dimension. The crossed grating structure may be formed on either side 16a and 16b of a single diffractive element, or it may be formed on one side of a single element, or it may be formed by combining two single-sided diffractive elements. If the crossed grating structure is formed by two elements then the corrugations may be positioned in one of several configurations: both elements having the corrugations facing the illumination 12, both facing the diffusing element 18, or one facing the illumination and the other facing the diffusing element. In any configuration, the corrugations are oriented perpendicular to one another. The two-dimensional array of diffractive orders of the diffracted light 25 is received by the diffusing element 18 to provide a two-dimensional soft-diffused uniform illumination. By controlling the strengths of the diffraction orders in diffracted light 25, a circular symmetric illumination can be provided from the system, as illustrated in FIG. 15A. By changing the strengths of the orders in one dimension, a tailored illumination can be produced from the system that is uniform, for example, over 90° horizontally and 30° vertically, as illustrated in FIG. 15B. The system 10a with a cross-grating diffractive element can be useful as a projection screen, such as for a projection television, due to the regularity of the grating structure.

A circular grating used as the diffractive element 14 in FIG. 14B directs normally incident light into many concentric cones of diffracted light 27. The angular spread of the cones is determined by the grating period of the diffractive element 14. The depth of the grating structure determines the amount of light diffracted into each cone. Each cone is received by the diffusing element 18 to provide a circular symmetric soft-diffused illumination from the system. These systems can be useful in providing a soft-light diffuser which can be used as, or in combination with, a window or skylight.

Figure 17:
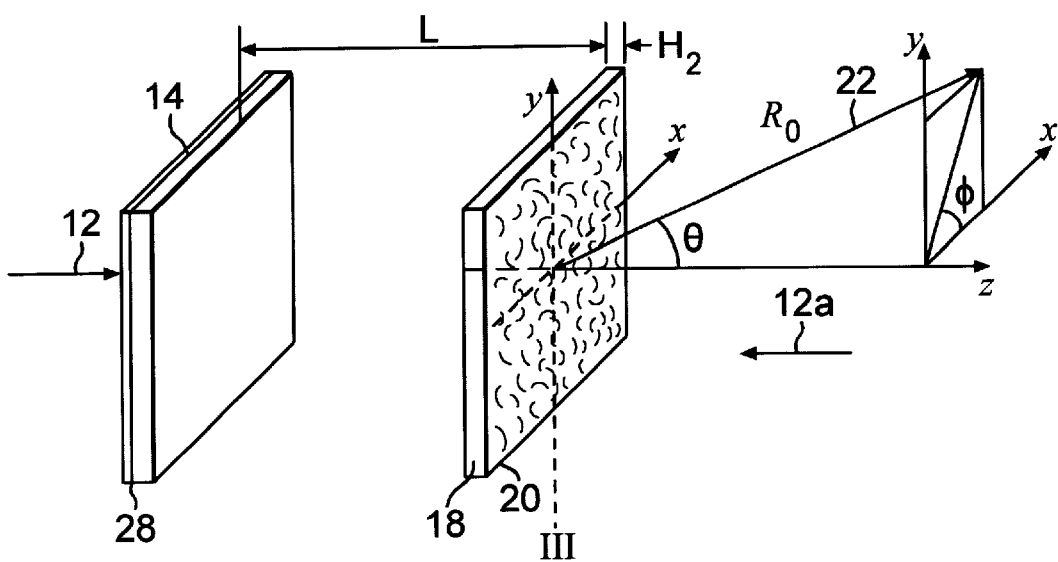
FIG. 17 is an example of the system of the present invention in which either an image transparency, or picture or print with a reflective surface, lies adjacent the diffractive element of the system.
Figure 16A:
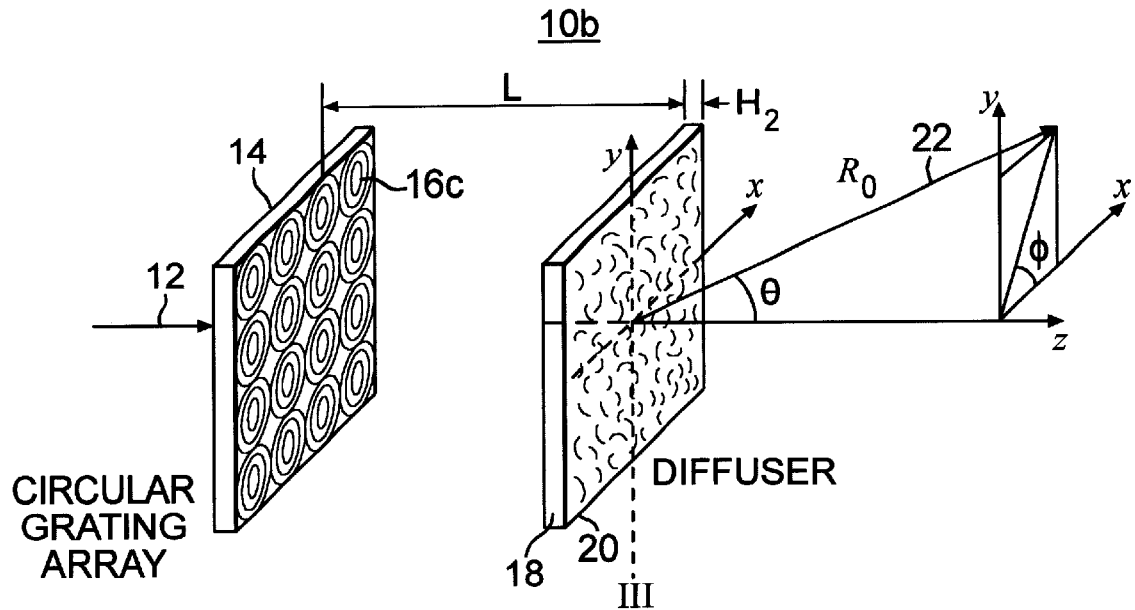
FIG. 16A is an optical diagram of the system according to the present invention having a diffractive element d a diffusing element in which the diffractive element is an array of circular gratings with the circular gratings arranged side by side.
Figure 16B:
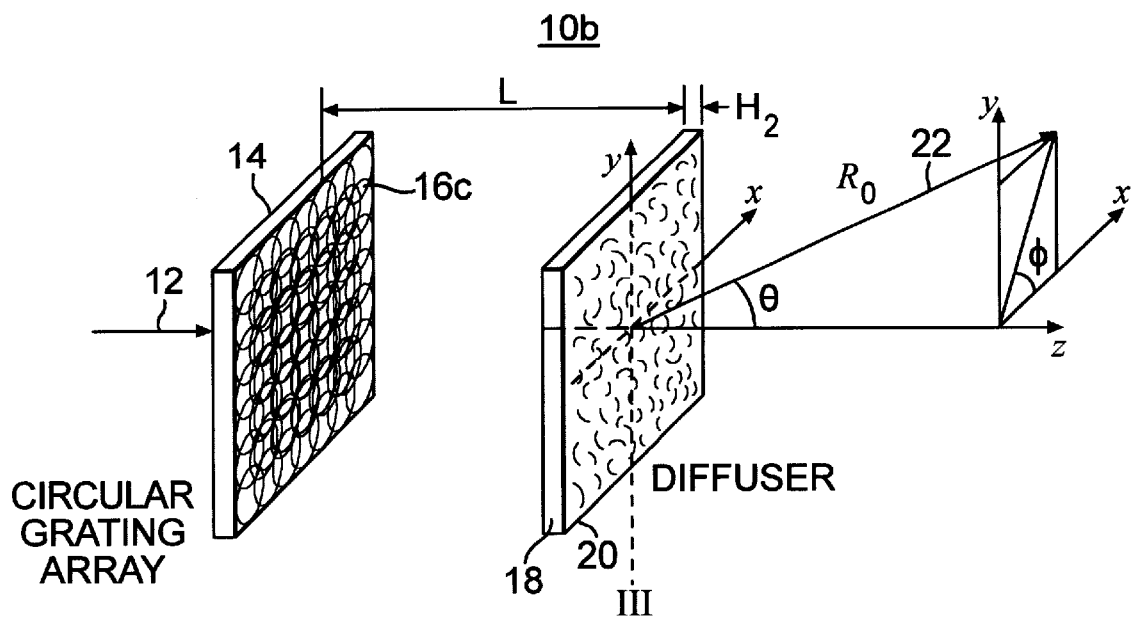
FIG. 16B is an optical diagram of the system according to the present invention having a diffractive element and diffusing element in which the diffractive element is an array of overlapping circular gratings.

Further, the diffractive element 14 may have an array of circular gratings 16c, as shown in system 10b of FIGS. 16A and 16B. System 10b is similar to system 10 and 10a, but incorporates a circular grating array. These gratings may be nested side by side with their edges touching, as shown in FIG. 16A, or the diffractive element may be constructed with overlapping circular gratings, as shown in FIG. 16B. For example, in FIG. 16B the center-to-center spacing of each circular grating may be one-half the grating diameter. System 10b is useful for projection screen or billboard applications, or the like, in which a picture or image is placed against or projected onto the optical system of the invention. Projection involves directing image illumination 12, which may represent an array of pixels in one or more color channels, to the diffractive element 14. In certain other display applications, an image transparency may be placed adjacent (against or near) the diffractive element 14, such that light representing the image from the transparency passes to the diffractive element 14 when light is received by the system. For example, FIG. 17 shows an image transparency 28 adjacent one side of diffractive element 14, where the other side of the diffractive element 14 faces diffusing element 18, in which light 12 is received by system 10b through the transparency. In further display applications, the cascade of the diffractive element 14 and diffusing element 18 may provide, or be a part of, a cover or screen for media having a reflective surface, for example, a print or picture, which is illuminated by reflected light that passes through the cascade to the media. This is also shown in the example of FIG. 17 in which 28 represents a print or picture lying adjacent the diffracting element 14, such that light 12a, rather than light 12, received through optical elements 14 and 18 is reflected from the surface of the print or picture through optical elements 14 and 18 to provide diffused reflected light from element 18 to each person viewing the print or picture.

In system 10b, each of the circular gratings or sites 16c (FIGS. 16A and 16B) may be associated with a small cluster of pixels having one or more pixels, such as 8×8 pixels, from an image placed against or projected onto the diffractive element 14. Thus, light from each pixel cluster is diffracted and diffused as it passes through its circular grating 16c and then the diffusing element 18 to spread uniformly to a viewing audience. System 10b produces a circular symmetric intensity distribution. Elliptical gratings, i.e., gratings with a larger grating period in one dimension than the other, may be used rather than circular gratings to tailor the intensity distribution from system 10b to particular viewing angles. Such a diffractive element 14 having an array of elliptical gratings can produce concentric elliptical cones of illumination to the diffusing element 18, and thus provide a large horizontal uniform distribution and a narrower vertical uniform distribution of light from system 10b.

The cascade of diffractive element 14 and diffusing element 18 can also be used as an envelope for a light bulb or light tube where controlled illumination is required, such as for sign or billboard illumination, street lights, store displays, and the like.

Elements 14 and 18, or body 24, may be made of glass, plastic, ceramic, or semiconductor, or other light transmissive to the illumination to be diffused. The diffractive element 14 may have an etched, embossed, or holographically recorded grating, depending on the type of material used, and diffusing element 18 may be similarly produced to create the desired rough surface. In particular, using plastics, such as polyethylene-or polycarbonate, the profile structure of the diffusing element 18 and a diffractive element 14 can be embossed, molded, or stamped using typical manufacturing methods. For example, optical elements 14 and 18 can be made of polyethylene or polycarbonate.

The system can also be configured for use in reflection by placing the thin diffusing element 18 directly in front of a reflective diffractive element 14. The system in a reflective configuration is similar to the cascades shown in FIGS. 1A–1C, 14A–14B, and 16A–16B, except that incident light 12 received by the system passes through diffusing element 18 to a reflective, diffractive surface 16 of diffractive element 14, and then the diffracted light produced by element 14 passes through the diffusing element 18 to provide diffused light. This configuration can be used for front projection screens.

The diffused light provided by system 10 is substantially uniform over a wide angle as shown by the below theory which first describes a mathematical model of a diffusing element and then field equations defining the combination of the diffracting element 14 and the diffusing element 18. The diffracting element 14 is referred to herein as a grating, and the diffusing element 18 is referred to herein as a diffuser.

Figure 2:
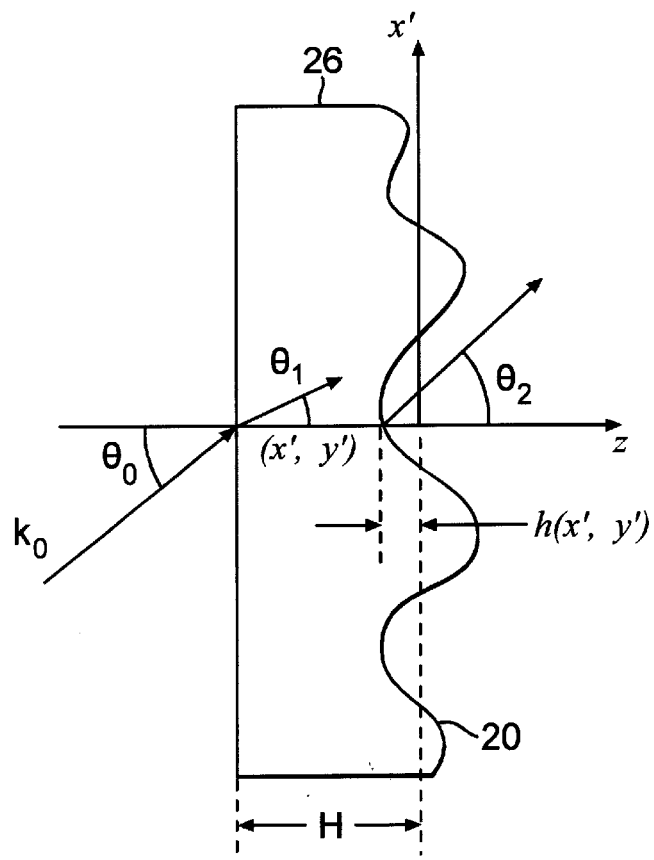
FIG. 2 is a optical diagram showing the scattering angles for a typical diffuser.

Referring to FIG. 2, the scattering from a diffuser 26 is shown having roughness h(x', y') in which (x', y') are transverse coordinates in the plane of the diffuser. For diffuser 26 located in the plane z=0 and illuminated by a linearly polarized monochromatic plan wave, the scalar component of the far zone electric field is $$v(x, y, z) = \frac{i\exp(-ikR_0)}{\lambda R_0}\cos\theta \int\int dx'dy' v_{II}(x', y')\exp\left[\frac{i2\pi}{\lambda R_0}(xx' + yy')\right], \quad (1)$$

where the integral is limited to a finite aperture. The point of observation, (x, y, z), is a distance $R_0$ from the origin and k is the wave number $2\pi/\lambda$ for a wavelength $\lambda$. A harmonic time dependence of $\exp(i\omega t)$ is implicitly used.

The term $v_{II}$ is the scalar component of the field emerging from the object in the plane z=0. It depends on the incident illumination and the transmission function of the diffuser. The field incident on the diffuser is decomposed into an angular spectrum of plane waves. If v is the analytic signal representation of the temporal Fourier transform of the time varying real-valued electric field, then the angular spectrum, V, in a plane parallel to the xy plane is defined by the two dimensional spatial Fourier transform relation $$V(f_x,f_y;z;\nu)=\int\int dx'dy' v(x',y',z;\nu)\exp[-i2\pi(x'f_x+y'f_y)], \quad (2)$$

with the corresponding inverse given by $$v(x',y',z;\nu)=\int\int df_x df_y V(f_x,f_y;z;\nu)\exp[i2\pi(x'f_x+y'f_y)]. \quad (3)$$

This is discussed, for example, in P. C. Clemmow, The Plane Wave Spectrum Representation of Electromagnetic Fields (Pergamon Press, New York, 1966). The variable ν is the temporal frequency.

The relationship between the spatial frequencies $f_x$ and $f_y$ and the direction cosines α and β with respect to the x and y axes is $$f_x = -\frac{\alpha}{\lambda_0} = -\frac{x}{\lambda_0 R_0} = -\frac{\sin\theta\cos\phi}{\lambda_0}, \quad (4)$$

$$f_y = -\frac{\beta}{\lambda_0} = -\frac{y}{\lambda_0 R_0} = -\frac{\sin\theta\sin\phi}{\lambda_0}.$$

The transmission function, t(x',y';α,β), of an object is that function which, when multiplied by a given input plane waves produces the output field $v_{II}$. From Equation (3) the differential field dv that emerges from a transmission object illuminated by a plane wave of frequencies $f_x$ and $f_y$ and strength $V_I$ is given by the incident plan wave times the transmission function of the object for that plane wave, i.e., $$dv(x',y',z;\nu)=V_I(f_x,f_y;z;\nu)\exp[i2\pi(x'f_x+y'f_y)]t(x',y';-\lambda_0 f_x,-\lambda_0 f_y)df_x df_y, \quad (5)$$

where the transmission function is written with the spatial frequencies. The total field is then the integral over all spatial frequencies incident on the object. Equation (5) represents the general case of transmission functions. If the object is independent of the input direction cosines, as in the case of a simple aperture, for example, then integration of Equation (5) yields an output field that is the product of the total input field and the transmission function.

For the special case of discrete incident plane waves, $V_I$ can be written in the plane z=0 as $$V_I(f_x, f_y; 0; v) = \sum_j B_j \delta\left(f_x + \frac{\alpha_j}{\lambda_0}\right)\delta\left(f_y + \frac{\beta_j}{\lambda_0}\right), \quad (6)$$

where each plan wave has an amplitude $B_j$ and direction cosines $\alpha_j$ and $\beta_j$.

From this, the field $v_{II}$ exiting the diffuser is determined, $$v_{II}(x', y') = \sum_j B_j \exp\left[-i\frac{2\pi}{\lambda_0}(\alpha_j x' + \beta_j y')\right] t_D(x', y'; \alpha_j, \beta_j), \quad (7)$$

where $t_D(x', y'; \alpha_j, \beta_j)$ is the transmission function of the diffuser for the input direction cosines $\alpha_j$ and $\beta_j$. Further analysis of the diffuser will be done for a single incident monochromatic unit-amplitude plane wave.

The transmission function, $t_D$, for a thin diffuser is given by $$t_D(x', y'; \alpha, \beta) = \exp\{-ik_0[Hn\cos\theta_1 + h(x', y')(n\cos\theta_1 - \cos\theta_2)]\}, \quad (8)$$

where n is the index of refraction and $\theta_1$ is the refraction angle in the diffuser medium. The angle $\theta_2$ is the output angle which depends on $\theta_1$, n, and the local surface slope by means of Snell's law, and h(x', y') is the zero-mean surface height profile measured in the +z direction. The constant phase term due to the average thickness, H, of the diffuser substrate can be dropped. If it is assumed that the surface slopes are small then the output angle, $\theta_2$, can be replaced by the input angle, $\theta_0$. Equation (8) is described, for example, in N. George, "Speckle at various planes in an optical system," Opt. Eng. 25, p.754–764 (1996), and L. G. Shirley and N. George, "Wide angle diffuser transmission functions and far zone speckle," J.Opt.Soc.Am A 4, p.734–745 (1987).

Next, the envelope or average intensity pattern that results from an ensemble of statistically identical diffusers is determined. The ensemble average of the intensity is $$\langle I \rangle = \frac{R_0^2}{A} \langle v(x, y, z) v^*(x, y, z) \rangle. \quad (9)$$

It is normalized by the total incident power on the diffuser, which is proportional to the aperture area, A, and is multiplied by the square of the distance $R_0$. The result is a function of the scattering angles $\theta$ and $\phi$, and has units of 1/steradian.

The resulting intensity for a Gaussian surface height distribution is given in L. G. Shirley and N. George, "Diffuser radiation patterns over a large dynamic range. 1: Strong diffusers," Appl. Opt. 27, p. 1850–1861 (1988), as $$\langle I \rangle = \quad (10)$$

$$\cos\theta \frac{2\pi}{\lambda^2} \int d\rho \rho J_0\left[2\pi\frac{\rho}{\lambda}\sqrt{\sin^2\theta - 2\sin\theta\sin\theta_0\cos(\phi - \phi_0) + \sin^2\theta_0}\right] \times$$

$$\exp\{-S^2[1 - r_{12}(\rho)]\},$$

where the integral is over the illuminating aperture and the cos $\theta$ is to the first power. $J_0$ is the zero-order Bessel function. The rms phase delay S for a given illumination angle $\theta_0$ is $$S = 2\pi\frac{\sigma}{\lambda}(n\cos\theta_1 - \cos\theta_0). \quad (11)$$

where, as described in the above-cited paper by L. G. Shirley and N. George, $\sigma$ is the rms height of the diffuser.

The surface correlation function, $r_{12}$, characterizes the structure of the surface. It is approximated by one of the following two forms obtained from the first two terms in a series expansion and represents extremes in surface structure. A surface with slowly varying and continuous slopes can be represented by a parabolic correlation function given by $$r_{12}(\rho) \cong 1 - \left(\frac{\rho}{l_c}\right)^2, \quad \rho \leq l_c, \quad (12)$$

where $l_c$ is the correlation length. A surface with a conical correlation has steep, discontinuous slopes and can be approximated by $$r_{12}(\rho) \cong 1 - \frac{|\rho|}{l_c}, \quad |\rho| \leq l_c. \quad (13)$$

The resulting forms for the expected intensity using these two representations are $$\langle I_P \rangle = \quad (14)$$

$$\pi\cos\theta\left(\frac{l_c}{\lambda S}\right)^2 \exp\left\{-\left(\frac{\pi l_c}{\lambda S}\right)^2 [\sin^2\theta - 2\sin\theta\sin\theta_0\cos(\phi - \phi_0) + \sin^2\theta_0]\right\},$$

for the parabolic surface denoted by the subscript P and $$\langle I_C \rangle = 2\pi\cos\theta\left(\frac{l_c}{\lambda S^2}\right)^2 \quad (15)$$

$$\left\{1 + \left(\frac{2\pi l_c}{\lambda S^2}\right)^2 [\sin^2\theta - 2\sin\theta\sin\theta_0\cos(\phi - \phi_0) + \sin^2\theta_0]\right\}^{-3/2},$$

for the conical surface denoted by the subscript C. These forms are derived from Equations (36) and (34), respectively, as described in the earlier cited paper by L. G. Shirley and N. George.

Figure 3:
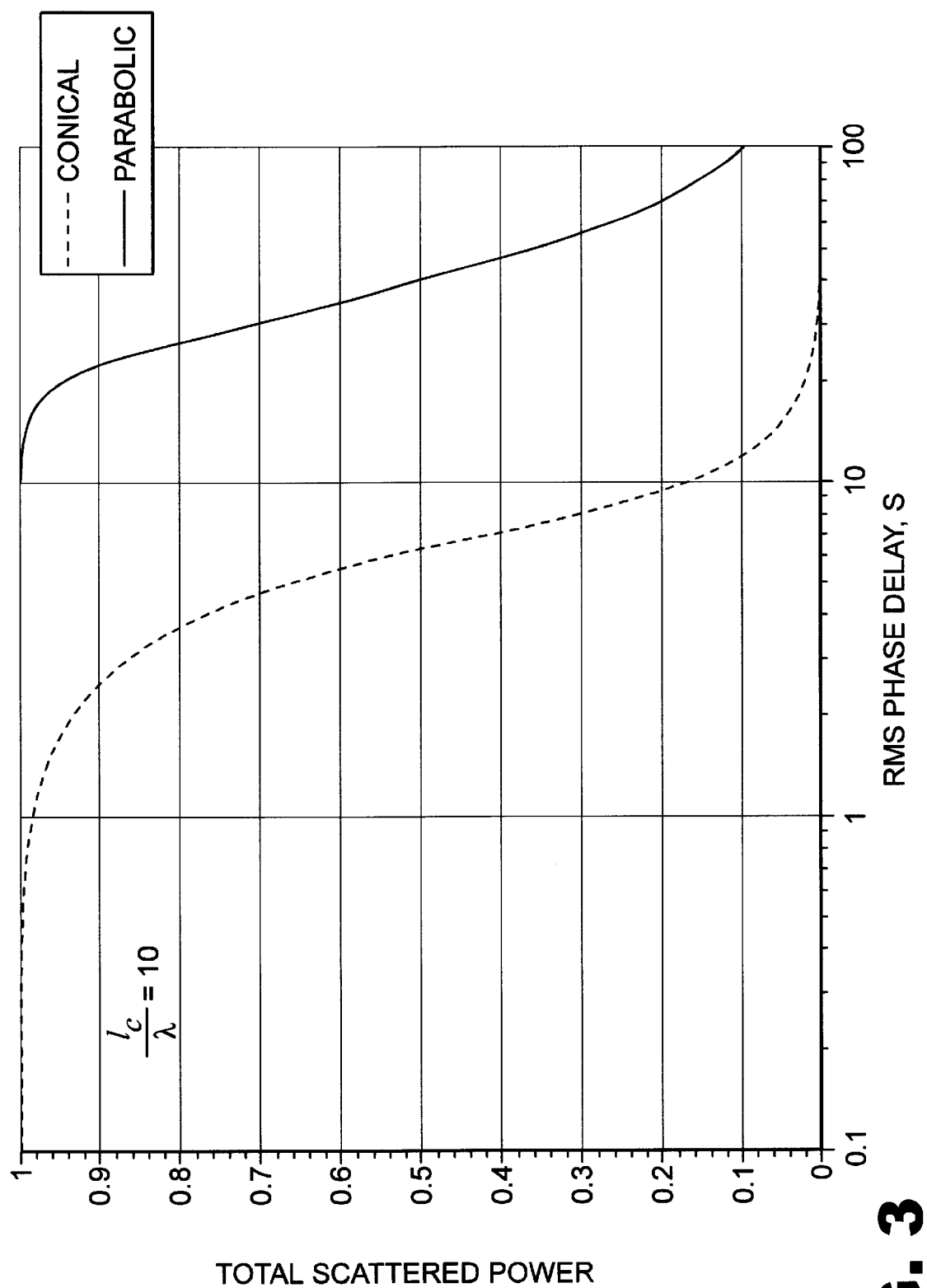
FIG. 3 is a graph illustrating the total scattered power from a parabolic and conical surface correlation functions for a mathematical model of the diffuser of FIG. 2 as a function of rms phase delay S for fixed correlation length.
Figure 12:
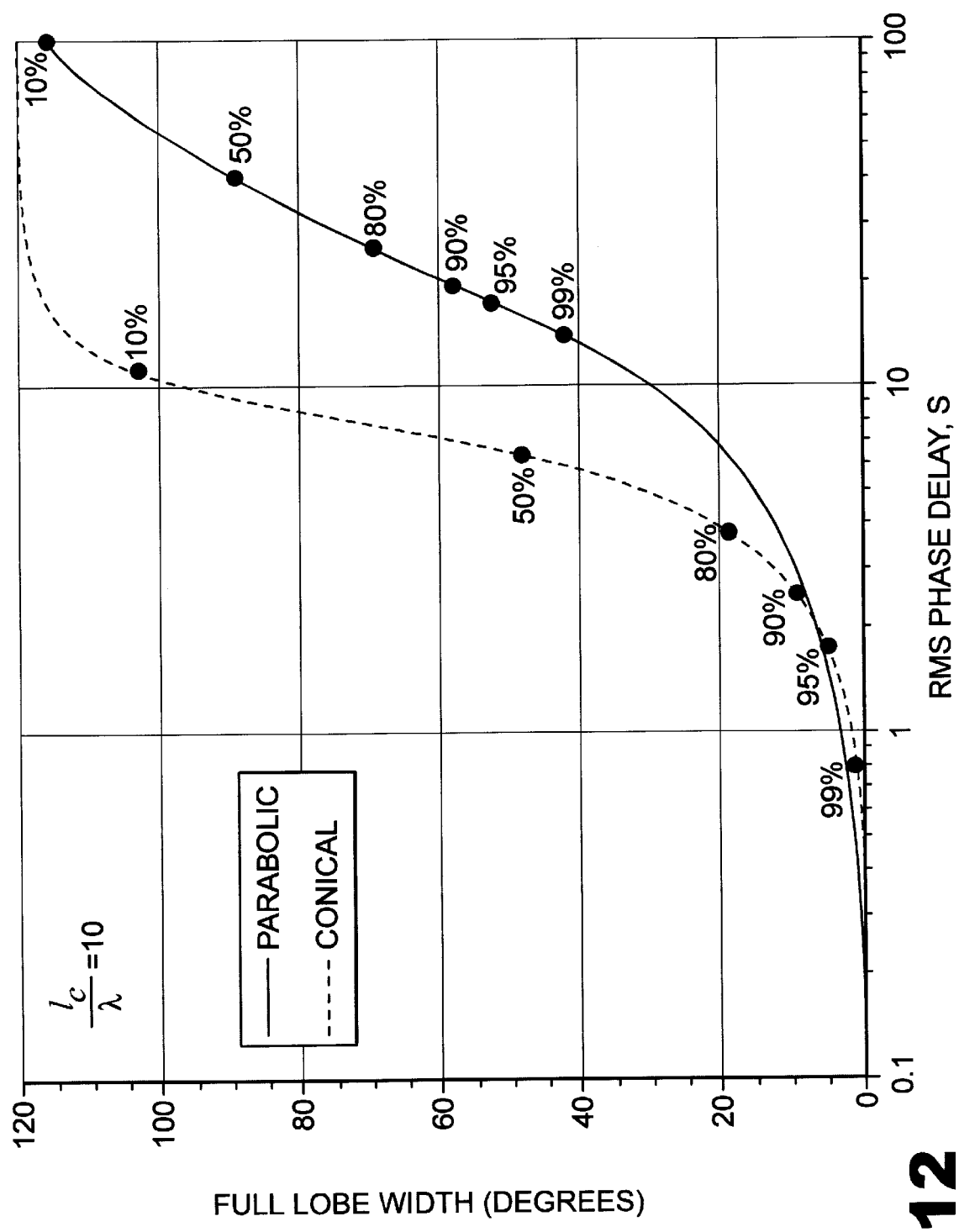
FIG. 12 is a graph illustrating the full-width-at-half-maximum versus rms phase delay, S, of the power spectrum for the parabolic and conical surface correlation functions of a diffuser for $l_c/\lambda=10$, in which the efficiencies at different lobe widths are denoted by the percentages.

For the purposes of a display, a diffuser with a broad scattering envelope and a high power throughput is desired. For the cases above the angular width of the scattering envelope increases as the roughness, either $\lambda S/l_c$ or $\lambda S^2/l_c$, increases. The total power scattered into the +z hemisphere, as determined from Equations (14) and (15) by integrating over $\theta$ and $\phi$, decreases with increasing roughness. This is shown in the graph of FIG. 3 of the normalized total scattered power versus S for a fixed correlation length. Thus, there is a trade off between lobe width and power throughput. However, the total power from the parabolic surface is larger than the conical surface for a given rms phase delay, S, and correlation length, so this type of surface will be considered. The properties of these equations are analyzed as follows:

Of the scattering properties of Equations (14) and (15) relative to the scattering angles for diffusers, the most important herein are the efficiency and lobe width. The lobe width, which is also referred to as the fill-width-at-half-maximum, is determined from the power spectrum of the diffuser 18, i.e., the intensity pattern of scattered light from the diffuser as a function of scattering angle. As the roughness increases for both the parabolic and conical surface correlations the lobe width increases but the efficiency decreases. This is shown graphically in FIG. 12 in which the full lobe width in degrees is plotted versus the rms phase delay for a fixed correlation length. Each surface type is shown with the efficiency taken from FIG. 3 shown as a percentage. The tradeoff in efficiency with lobe width is most severe for the conical surface showing a 10% loss at only 10° lobe width. The parabolic diffuser, however, can provide a 50° lobe width with less than 5% reduction in efficiency.

Figure 13:
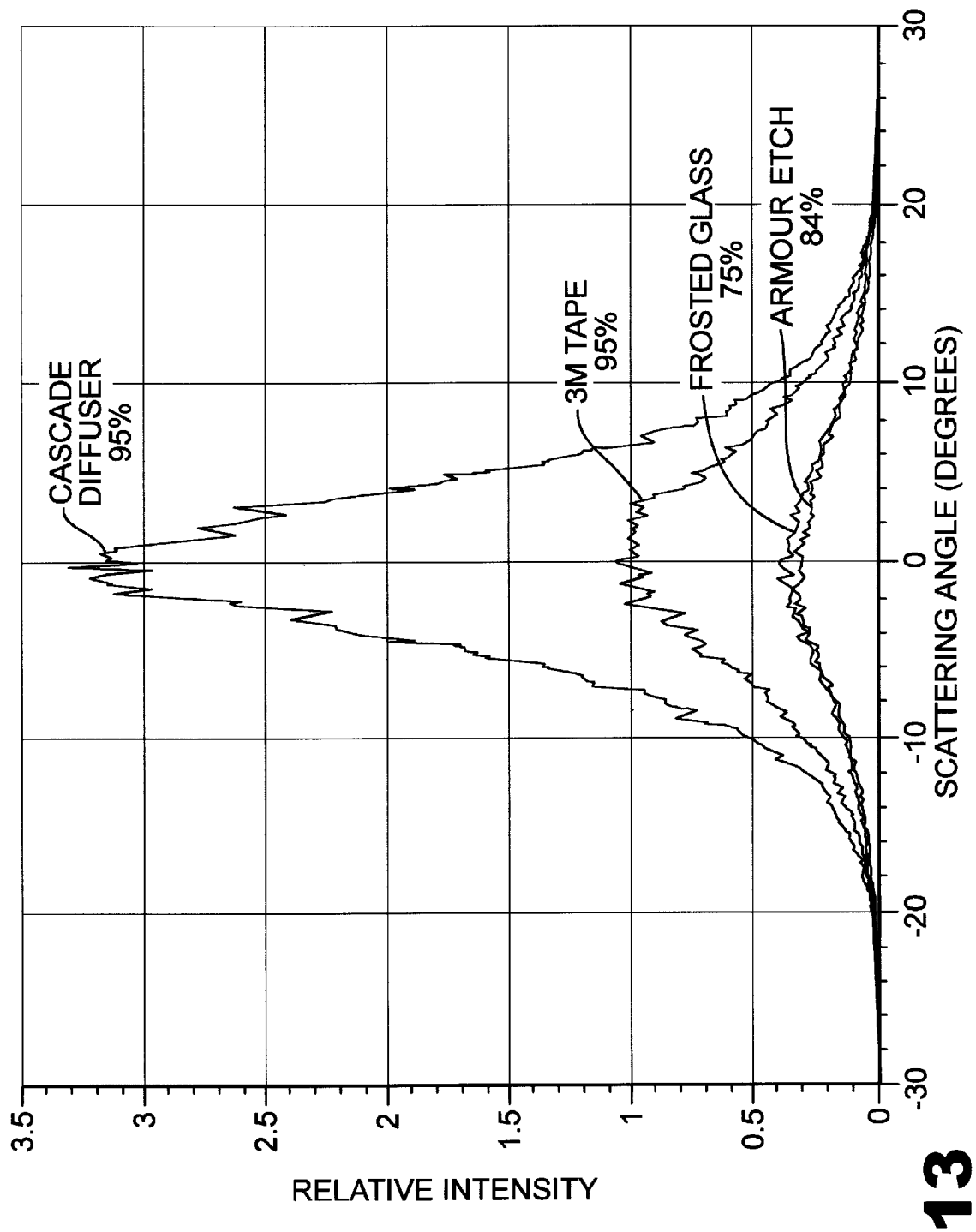
FIG. 13 is a graph illustrating the small angle scattering patterns from a diffuser in the system of the present invention, 3M Magic Tape type 810, frosted microscope slide, and glass etched with Armour Etch, in which the efficiency of each is denoted by the percentages.

The scattering patterns of several materials are shown in FIG. 13 including the diffuser used for the cascade, a diffuser etched for 30 minutes in Armour Etch, 3M Magic Brand Tape (type 810), and a frosted microscope slide. The efficiency is given by the percentage next to each name. The 3M tape makes an excellent diffuser with the same efficiency as the cascade diffuser, however, the cascade diffuser is better suited to the issue at hand since it scatters mostly in the central lobe. The frosted glass and Armour etched diffuser are significantly less efficient yet have a similar lobe width. Thus, they are less desirable for use as a projection screen.

The intensity distribution from the parabolic diffuser, unlike the conical diffuser, is independent of wavelength aside from the variation in the index of refraction, n, in the rms phase delay, S.

The above description discussed the expected intensity pattern of a model diffuser 26 (FIG. 2) illuminated by a plane wave at an arbitrary incident angle. Using this model diffuser, system 10 having a diffuser and grating will now be mathematically described.

Referring back to FIG. 1, to broaden the diffuser pattern while maintaining high throughput efficiency, optical system 10 is provided in which a narrow-scattering-angle diffuser 18 is illuminated simultaneously at multiple incident angles by a diffraction grating 14 placed in front of the diffuser. As stated earlier, the resulting intensity distribution from diffuser 18 is a superposition of the individual intensity patterns weighted by the strengths of the grating diffraction orders. To show this, the field exiting the combination of the grating 14 and diffuser 18 is described mathematically below.

The grating is illuminated by a monochromatic normally-incident plane wave of unit amplitude followed by a diffuser in one of the configurations shown in FIGS. 1A–1C. In any case, the incident spectrum at the grating $V_I$ is a delta function $\delta(f_x, f_y)$ and the field exiting the grating, from Equation (5) is simply the transmission function of the grating given by the general form $$t_G(x', y') = \sum_j B_j \exp\left\{-i2\pi \frac{jx}{\Lambda}\right\}, \quad (16)$$

where f is the grating period and $B_j$ are the amplitudes of the diffraction orders. This field is then decomposed into its angular spectrum which is given as the 2-D Fourier transform of the grating transmission function. The transform is $$\mathcal{F}\{t_G(x', y')\} = \delta(f_y) \sum_{j=-M}^{M} B_j \delta\left[f_x + \frac{j}{\Lambda}\right], \quad (17)$$

where $\mathcal{F}$ represents the 2-D Fourier transform and the frequency-variable arguments of the delta functions give the angular direction of the diffraction orders. The first delta function restricts the k vectors of the diffracted plane waves to the xz plane, i.e., $\phi=0$ or $\pi$. The second delta function is non-zero when $f_x$ is an integer divided by the grating period, $\Lambda$. From Equation (4) sin $\theta=x/R_0=-\lambda_0 f_x$ which gives the familiar grating equation sin $\theta=m\lambda_0/\Lambda$, for an integer m. The summation has fixed limits to maintain a physically realizable diffraction angle.

This discrete spectrum of plane waves illuminates the diffuser as in Equation (6). For each plane wave exiting the grating the appropriate diffuser transmission function is written given in Equation (8) including the phase delays due to the separation of the planes of the grating and diffuser. If $V_{II}$ represents the angular spectrum of the field exiting the grating at plane II, then the field exiting the diffuser is $$v_{III}(x', y', 0; \nu) = \int\int V_{II}(f_x, f_y; 0; \nu) \exp[i2\pi(x'f_x + y'f_y)] t_D(x', y'; -\lambda_0 f_x, -\lambda_0 f_y) df_x df_y, \quad (18)$$

where z is set to zero (z=0) since the grating is taken to be at this plane. Inserting the angular spectrum of the grating and the diffuser transmission function, the result for the forward grating of FIG. 1A is obtained, $$v_{III}(x', y', 0; \nu) = \sum_j B_j \int\int df_x df_y \delta(f_y)\delta\left(f_x + \frac{j}{\Lambda}\right) \quad (19)$$

$$\exp[-ikh_D(x', y')(n\cos\theta_{1j} - \cos\theta_j)] \times$$

$$\exp[-ik(L\cos\theta_j + nH\cos_{1j})]$$

$$\exp[i2\pi(x'f_x + y'f_y)].$$

The subscript j on the angle θ indicates the incident angle to the diffuser. Similar expressions result for the configurations of FIGS. 1B and 1C, but with different phase terms due to the separations of the surfaces. The relationship between the spatial frequency variables and the incident angles is $$f_x = -\frac{\sin\theta_j \cos\phi_j}{\lambda}, \quad (20)$$

$$f_y = -\frac{\sin\theta_j \sin\phi_j}{\lambda}.$$

Performing the integration yields $$v_{III}(x', y', 0; \nu) = \sum_j B_j \exp[-ikh_D(x', y')(n\cos\theta_{1j} - \cos\theta_j)] \times \quad (21)$$

$$\exp[-ik(L\cos\theta_j + nH\cos\theta_{1j})]\exp\left[-i2\pi\frac{jx'}{\Lambda}\right].$$

This is the field exiting the cascade. The angular relationships are $$\phi_j = 0, \quad (22)$$

$$\sin\theta_j = \frac{j\lambda}{\Lambda},$$

$$n\sin\theta_{1j} = \sin\theta_j.$$

The far zone expression for the field from Equation (1) then becomes $$v(x, y, z) = \frac{i\exp(-ikR_0)}{\lambda R_0}\cos\theta \sum_{j=-\infty}^{\infty} B_j \exp[-ik(L\cos\theta_j + nH\cos\theta_{1j})] \times \quad (23)$$

$$\int\int dx' dy' \exp[-ikh_D(x', y')(n\cos\theta_{1j} - \cos\theta_j)]$$

$$\exp\left\{ik\left[\left(\frac{x}{R_0} - \frac{j\lambda}{\Lambda}\right)x' + \frac{y}{R_0}y'\right]\right\}.$$

The calculation of the intensity proceeds by taking an ensemble average of vv* with the grating orders producing multiple illumination angles for the diffuser 18.

The expected intensity, normalized as in Equation (9), is $$\langle I \rangle = \frac{\cos\theta}{A\lambda^2} \sum_{j=-\infty}^{\infty} \sum_{l=-\infty}^{\infty} B_j B_l \exp\{-ik[L(\cos\theta_j - \cos\theta_l) + nH(\cos\theta_{1j} - \cos\theta_{1l})]\} \times \quad (24)$$

$$\int\int\int\int dx'dy'dx''dy'' F_2\left(\frac{n\cos\theta_{1j} - \cos\theta_j}{\lambda}, -\frac{n\cos\theta_{1l} - \cos\theta_l}{\lambda}; r_{12}\right) \times$$

$$\exp\left\{\frac{i2\pi}{\lambda}\left[\frac{x}{R_0}(x'-x'') - \frac{\lambda}{\Lambda}(jx'-lx'') + \frac{y}{R_0}(y'-y'')\right]\right\}.$$

The function $F_2$ is the second order characteristic function of the height h defined for a Gaussian distribution by $$F_2[\eta_1,\eta_2;r_{12}(\rho)] = \langle\exp\{-i2\pi[\eta_1 h_D(x',y') + \eta_2 h_D(x'',y'')]\}\rangle \quad (25)$$

where r is the surface correlation function which is assumed to depend on the separation of the points (x', y') and (x", y"). The double summation can be broken into two summations in which j=l and j≠l as follows:

$$\langle I \rangle = \quad (26)$$

$$\frac{\cos\theta}{A\lambda^2}\sum_{j=-\infty}^{\infty} B_j^2 \int\int\int\int dx'dy'dx''dy'' F_2\left(\frac{n\cos\theta_{1j} - \cos\theta_j}{\lambda}, -\frac{n\cos\theta_{1j} - \cos\theta_j}{\lambda}; r_{12}\right) \times$$

$$\exp\left\{\frac{i2\pi}{\lambda}\left[\left(\frac{x}{R_0} - \frac{j\lambda}{\Lambda}\right)(x'-x'') + \frac{y}{R_0}(y'-y'')\right]\right\} +$$

$$\cos\theta \frac{1}{A^2\lambda^2}\sum_{j=-\infty}^{\infty}\sum_{l\ne j}^{\infty} B_j B_l \exp\{-ik[L(\cos\theta_j - \cos\theta_l) + nH(\cos\theta_{1j} - \cos\theta_{1l})]\} \times$$

$$\int\int\int\int dx'dy'dx''dy'' F_2\left(\frac{n\cos\theta_{1j} - \cos\theta_j}{\lambda}, -\frac{n\cos\theta_{1l} - \cos\theta_l}{\lambda}; r_{12}\right) \times$$

$$\exp\left\{\frac{i2\pi}{\lambda}\left[\frac{x}{R_0}(x'-x'') - \frac{\lambda}{\Lambda}(jx'-lx'') + \frac{y}{R_0}(y'-y'')\right]\right\}.$$

For each integration, the variable substitution u=x'−x" and v=y'−y' is made, and the first integral is further simplified by changing to polar coordinates since $r_{12}$ is a function of $(u^2+v^2)^{1/2}$. The evaluation of this first integral is then identical to that in the description of the model diffuser 26 (FIG. 2). In the second integral, s=x'+x" and w=y'+y" to provide the following integral, $$\int\int\int\int \cdots = \quad (27)$$

$$\frac{1}{4}\int\int du\,dv F_2\left(\frac{n\cos\theta_{1j} - \cos\theta_j}{\lambda}, -\frac{n\cos\theta_{1l} - \cos\theta_l}{\lambda}; r_{12}\right)$$

$$\exp\left\{\frac{i2\pi}{\lambda}\left[\frac{x}{R_0}u + \frac{y}{R_0}v\right]\right\} \times \exp\left\{-\frac{i2\pi}{\Lambda}\frac{u}{2}(j+l)\right\}$$

$$\int\int ds\,dw \exp\left\{-\frac{i2\pi}{\Lambda}\frac{s}{2}(j-l)\right\}.$$

The limits of s and w are on the order of the aperture and thus the s integral, for an aperture substantially larger than the grating spacing Λ, tends to zero due to the rapidly oscillating exponential term. In Equation (26), just the first set of integrals are left where j=l.

The intensity is evaluated to the following expressions for the parabolic and conical correlation functions, respectively:

$$\langle I_P \rangle = \quad (28)$$

$$\pi\cos\theta \sum_{j=-M}^{M} B_j^2 \left(\frac{l_c}{\lambda S_j}\right)^2 \exp\left\{-\left(\frac{\pi l_c}{\lambda S_j}\right)^2\left[\sin^2\theta - \frac{2j\lambda}{\Lambda}\sin\theta\cos\phi + \left(\frac{j\lambda}{\Lambda}\right)^2\right]\right\},$$

$$\langle I_C \rangle = 2\pi\cos\theta \sum_{j=-M}^{M} B_j^2 \left(\frac{l_c}{\lambda S_j^2}\right)^2 \quad (29)$$

$$\left\{1 + \left(\frac{2\pi l_c}{\lambda S_j^2}\right)^2\left[\sin^2\theta - \frac{2j\lambda}{\Lambda}\sin\theta\cos\phi + \left(\frac{j\lambda}{\Lambda}\right)^2\right]\right\}^{-3/2},$$

where the rms phase delay is given by $$S_j = \frac{2\pi\sigma}{\lambda}\left[\sqrt{n^2 - \left(\frac{j\lambda}{\Lambda}\right)^2} - \sqrt{1 - \left(\frac{j\lambda}{\Lambda}\right)^2}\right]. \quad (30)$$

This is seen as the superposition of the individual diffuser patterns from Equation (14) and (15) at the prescribed diffraction angles weighted by the strengths of the diffraction orders.

These are also the results for the cascade of FIG. 1B and FIG. 1C. The only difference is in the strengths of the diffraction orders for a given grating profile.

Based on the total power that radiates in the forward direction from the diffuser 18 in system 10, the parabolic correlation is selected to be optimized since it has a higher power for a given S. Maximum power occurs for roughness $l_c/(\lambda S) \geq 1$. The width of the scattering lobe of the diffuser 18 decreases as this parameter increases, i.e., as the diffuser becomes smoother. The goal is to match a diffuser with a grating such that the first diffraction order of the grating falls near the point at which the lobe (i.e., power spectrum of the diffuser) is approximately one-half (½) its peak value. This defines the grating spacing $\Lambda$ in terms of $l_c/(\lambda S)$.

Figure 4A:
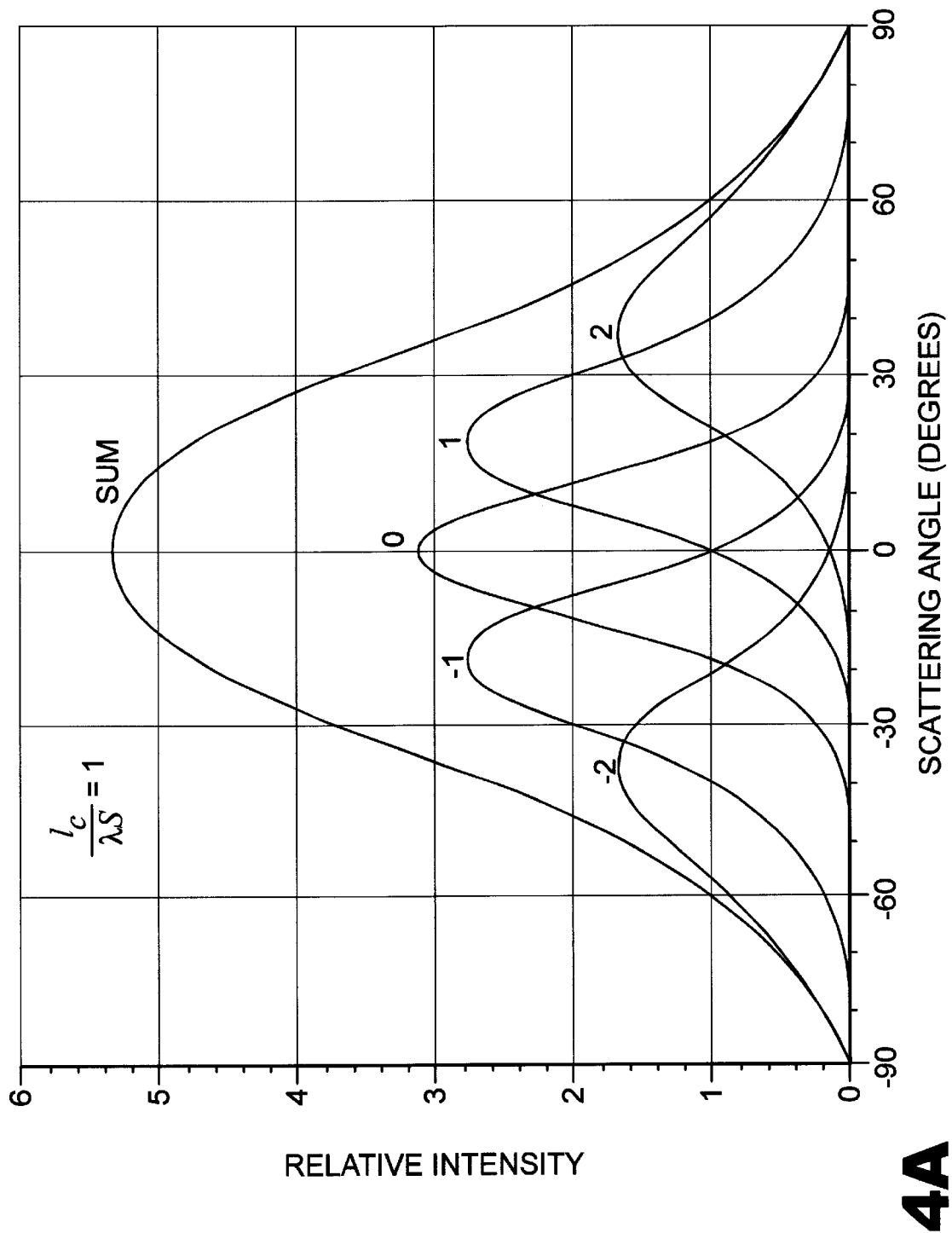
FIG. 4A is a graph illustrating the scattering patterns (relative intensity at varying scattering angles) for a parabolic diffuser for $l_c/(\lambda S)=1$ at five illumination angles of 0°, ±20°, and ±43.20° and the sum of their scattering patterns.

The strengths of the diffraction orders required to obtain uniformity of the intensity pattern over a large angular range (for example, ±45°) are described below for a single wavelength. A parabolic diffuser with $l_c/(\lambda S)=1$ has a full lobe width (to the 1/e point) of approximately 40°. Therefore, a grating with a 20° diffraction angle is chosen at the desired wavelength. Such a grating will have 5 diffraction orders: 0°, ±20°, and ±43.2°. In FIG. 4A, the individual scattering patterns from the diffuser at these incident angles and their sum are shown. The sum is the pattern expected if all the grating diffraction orders were of equal strength. Note that the peaks of the curves are shifted toward zero degrees due to the cosine factor in the expected intensity. It is at the peaks that the sum of all five individual scattering patterns is optimized by choosing appropriate coefficients which determine the strengths of the diffraction orders of grating 14. Due to the symmetry of the patterns, only three coefficients are needed since the + and − orders will be the same. The zero-order coefficient, $B_0^2$ is set to 1 so that the other orders will be scaled relative to it. Equation (28) can be written in the simplified form of $$\langle I(\theta_m) \rangle = \sum_{j=-M}^{M} B_j^2 \langle I_j(\theta_m) \rangle = B_0^2 \langle I_0(\theta_m) \rangle + \sum_{j=1}^{M} B_j^2 [\langle I_j(\theta_m) \rangle + \langle I_{-j}(\theta_m) \rangle], \quad (31)$$

where $I_j$ is the individual intensity pattern for the $j^{th}$ diffraction order and $\theta_m$ is the angular position of the peak. At each $\theta_m$, the sum is required to be a constant, designated as C. Equation (31) is then rearranged and forms the following matrix equation:

$$AB = -I, \quad (32)$$

where the variables are $$A = \begin{pmatrix} \langle I_1(\theta_0) \rangle + \langle I_{-1}(\theta_0) \rangle & \cdots & \langle I_M(\theta_0) \rangle + \langle I_{-M}(\theta_0) \rangle & 1 \\ \langle I_1(\theta_1) \rangle + \langle I_{-1}(\theta_1) \rangle & \cdots & \langle I_M(\theta_1) \rangle + \langle I_{-M}(\theta_1) \rangle & 1 \\ \vdots & \vdots & \vdots & \vdots \\ \langle I_1(\theta_M) \rangle + \langle I_{-1}(\theta_M) \rangle & & \langle I_M(\theta_M) \rangle + \langle I_{-M}(\theta_M) \rangle & 1 \end{pmatrix}, \quad (33)$$

$$B = \begin{pmatrix} B_1^2 \\ \vdots \\ B_M^2 \\ -C \end{pmatrix}, \quad I = \begin{pmatrix} \langle I_0(\theta_0) \rangle \\ \langle I_0(\theta_1) \rangle \\ \vdots \\ \langle I_0(\theta_M) \rangle \end{pmatrix}.$$

Determining the unknown coefficients and the resulting sum is provided by solving for B. Table I below lists the angles of the peaks of the diffuser patterns for the 20° grating, the coefficients or relative strengths of the diffraction orders for a uniform power distribution, and the final sum at the peak angles. The coefficients are normalized by their total sum to conserve the incident power. These values are also shown in Table I.

TABLE I

| Diffraction Order | Peak Angle | Coefficient, $B^2j$ | Normalized by $\Sigma B^2_j$ |
|---|---|---|---|
| 0 | 0.0° | 1.0 | 0.141 |
| ±1 | ±18.80° | 0.588 | 0.083 |
| ±2 | ±37.70° | 2.450 | 0.346 |
| Sum C | | 4.766 | 0.674 |

Figure 4B:
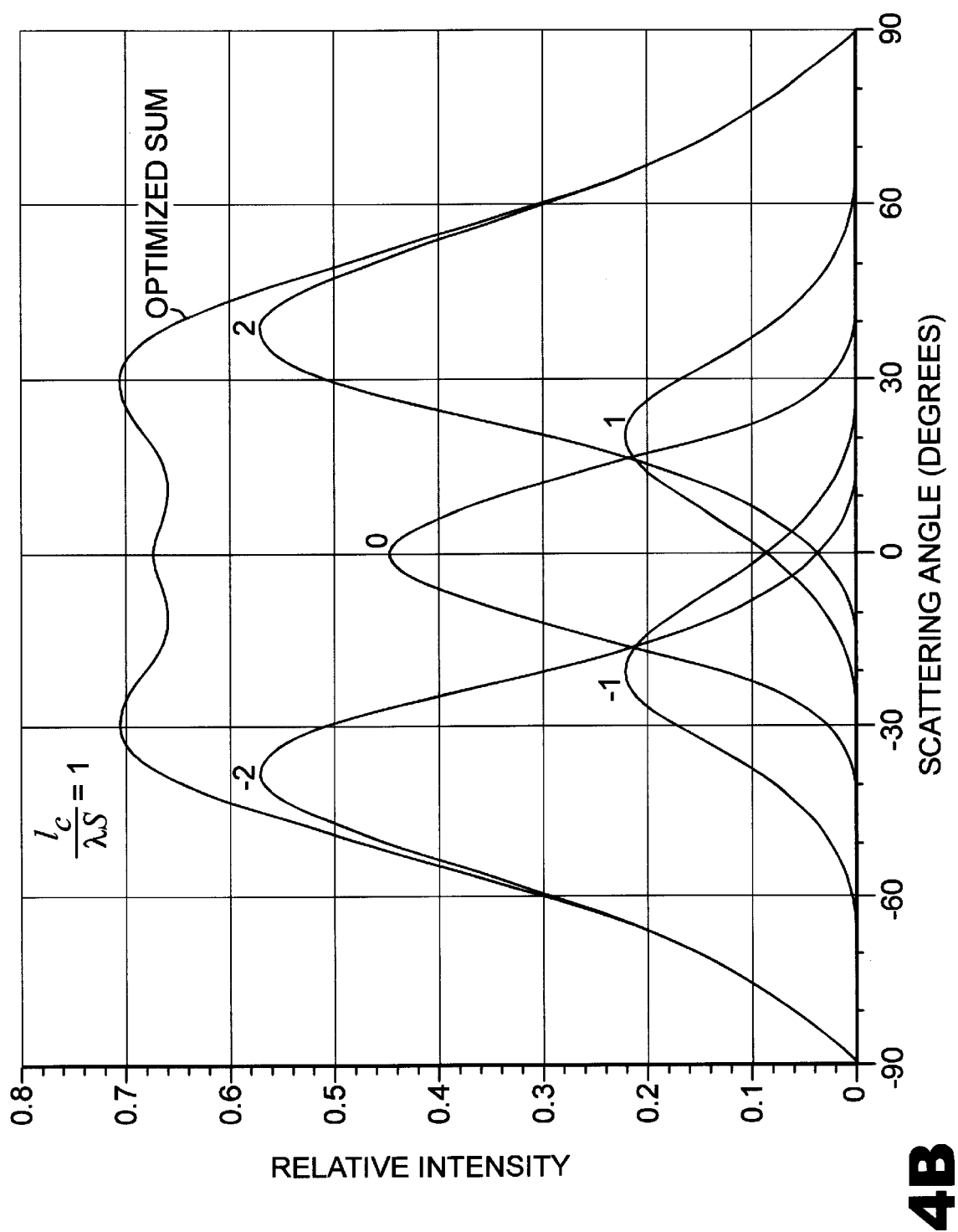
FIG. 4B is a graph illustrating the scattering patterns for a parabolic diffuser of FIG. 4A scaled by the normalized coefficients of Table I, and the optimized sum of the resulting scattering pattern of the combination of the diffraction grating and the diffuser of the system shown in FIG. 1A.

In FIG. 4B, the individual scaled diffuser patterns are shown using the normalized coefficients along with their optimized sum for the parabolic surface correlation. The optimized sum of the patterns is fairly flat over a ±40° angular spread with less than 10% variation from the designed sum value within this angular range. To decrease this variation, and further flatten the pattern requires more closely-spaced diffraction orders and a narrower diffuser pattern.

Figure 5A:
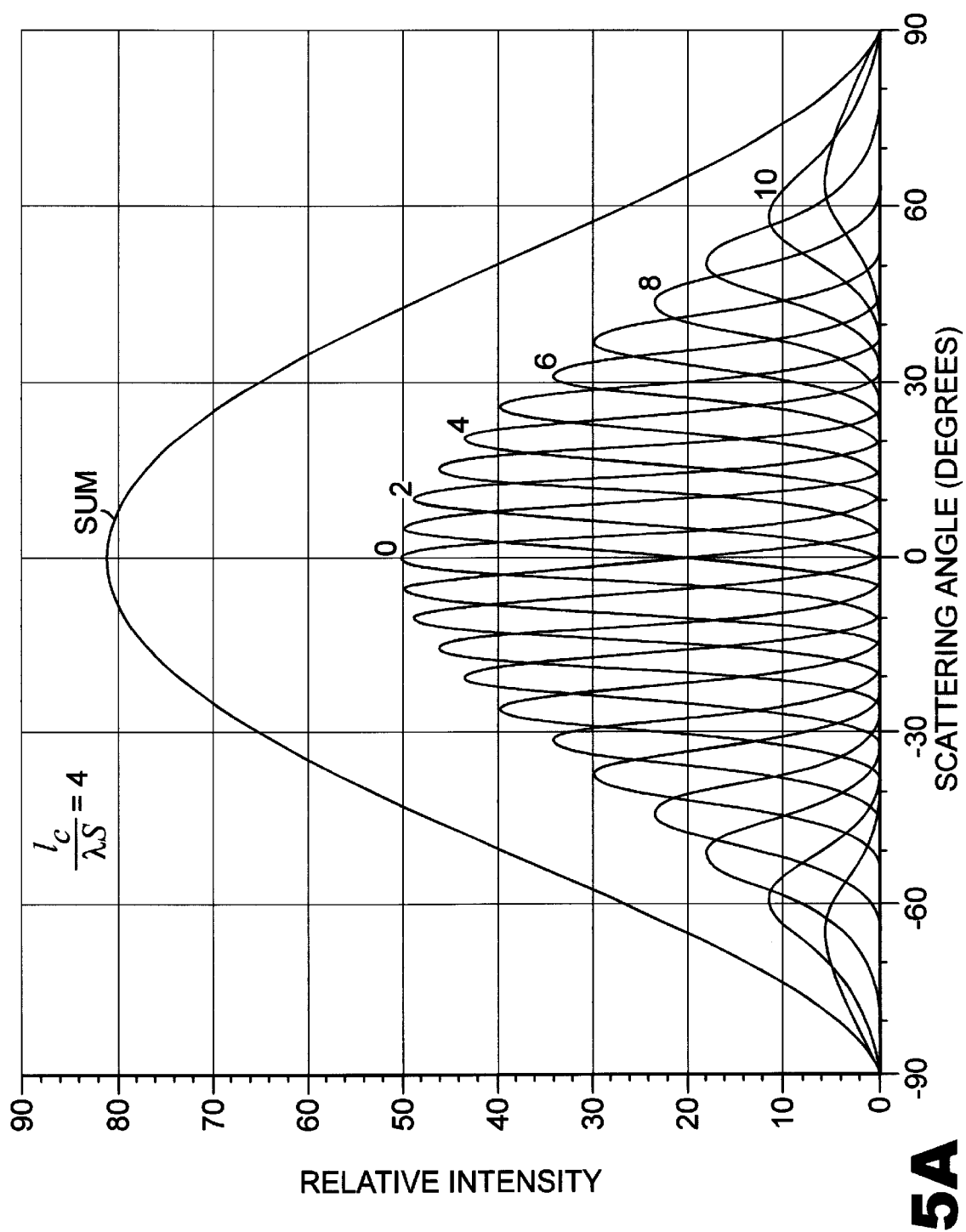
FIG. 5A is a graph illustrating the scattering patterns for a parabolic diffuser for $l_c/(\lambda S)=4$ at illumination angles corresponding to the diffraction angles of a 5° grating, and the sum of their scattering patterns.
Figure 5B:
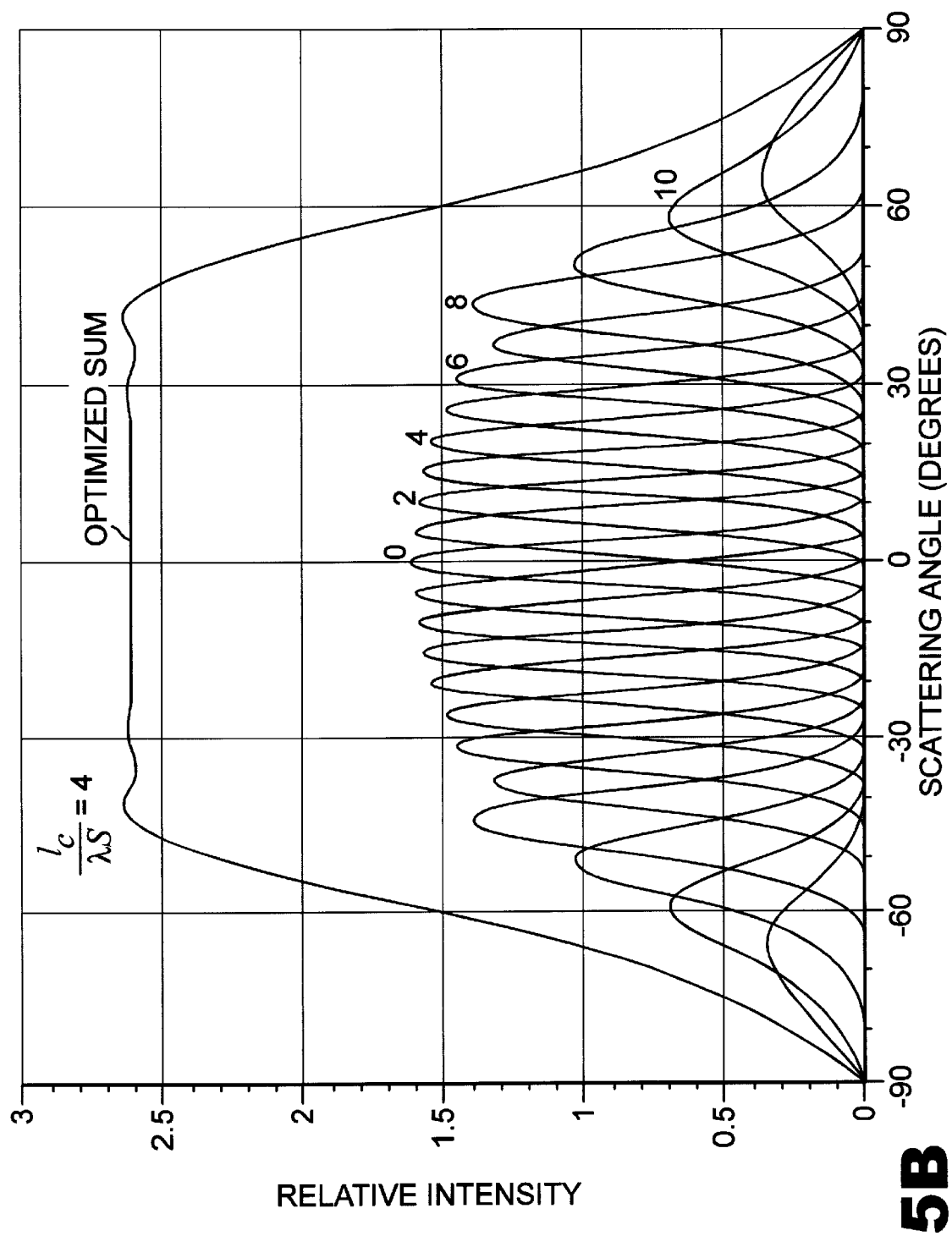
FIG. 5B is a graph illustrating the scaled scattering patterns for a parabolic diffuser of FIG. 5A, and the optimized sum of the resulting scattering pattern of the combination of the diffraction grating and the diffuser of the system shown in FIG. 1A.

A parabolic diffuser with $l_c/(\lambda S)=4$ has a 1/e point of about 5°. A grating whose first diffraction order falls at 5° will have 23 total orders with 17 in the range of ±45°. Although all 23 orders can be optimized, the higher orders have large angular separations and will not yield satisfying results. Therefore, the first 17 (from −8 to +8) are optimized with the remaining six being scaled arbitrarily to the same coefficient as the 8th order. FIG. 5A is a graph of the $l_c/(\lambda S)=4$ diffuser patterns at the diffraction angles of the 5° grating showing all 23 orders. There are nine unknown quantities—eight coefficients for orders 1 to 8, and the resulting sum. Again, the zero-order coefficient is set to 1. The optimizing coefficients and their normalized values for a uniform power distribution are shown in Table II below along with the peak angle location of the diffuser patterns for the 5° grating and the final sum. The scaled diffuser patterns and the optimized result are shown in FIG. 5B. The optimized intensity distribution is substantially flat (i.e., uniform), varying less than 2% over the ±45° span (i.e., a wide angular range of 90°).

TABLE II

| Diffraction Order | Peak Angle | Coefficient, $B^2j$ | Normalized by $\Sigma B^2_j$ |
|---|---|---|---|
| 0 | 0.0° | 1.0 | 0.0318 |
| ±1 | ±4.98° | 1.006 | 0.0320 |
| ±2 | ±10.00° | 1.026 | 0.0327 |
| ±3 | ±15.10° | 1.059 | 0.0337 |
| ±4 | +20.32° | 1.111 | 0.0354 |
| ±5 | ±25.71° | 1.178 | 0.0375 |
| ±6 | ±31.34° | 1.302 | 0.0414 |
| ±7 | ±37.30° | 1.378 | 0.0439 |
| ±8 | ±43.71° | 1.786 | 0.0569 |
| ±9 to ±11 | | 1.786 | 0.0569 |
| Sum C | | 81.698 | 2.601 |

To use optical system 10 (FIGS. 1A–C) as a part of a display system, such as for a projection TV, an understanding of the variation of these results with wavelength is important. Ideally, the optimized intensity distribution from the diffuser-grating cascade should be uniform over a broad spectrum. However, the angular spread of the grating diffraction orders will change with wavelength as given by the grating equation. With longer wavelengths, the angular separation will increase, and the intensity distribution from the cascade will tend to round over. At shorter wavelengths, the diffraction angles will decrease and the intensity distribution may tend to increase near the edges of the optimization range.

If it is assumed that the grating transmission is due to a periodic phase modulation arising from either an index variation, as in a volume holographic grating, or a periodic height variation, as in a surface relief grating, then the transmission function takes the form $$t_G(x',y')=\exp[-ik_0L(x')], \quad (34)$$

where $L(x')$ is the periodic optical path length difference of the transmitted wavefront. From Equation (16), another form for $t_G$ is obtained, namely, $$t_G(x', y') = \sum_{j=-\infty}^{\infty} B_j \exp\left[-i2\pi\frac{jx'}{\Lambda}\right]. \quad (35)$$

Equating the phase of these expressions yields $$\phi_0 = -k_0 L(x') = \text{Phase}\left[\sum_{j=-\infty}^{\infty} B_j \exp\left(-i2\pi\frac{jx'}{\Lambda}\right)\right]. \quad (36)$$

By changing the wavelength from $\lambda_0$ to $\lambda'$ (or wavenumber from $k_0$ to $k'$) the phase is changed from $\phi_0$ to $$\phi' = \frac{k'}{k_0}\phi_0. \quad (37)$$

Given the optimized coefficients of Table II at the designed wavelength of 0.55 μm, for example, the transmission function is formed as in Equation (35). Phase is determined and scaled according to Equation (37). This is then inserted into Equation (34) from which a Fourier series is generated and the new coefficients are determined.

There is an ambiguity in the sign of the original $B_j$ since the optimization gives $B_j^2$. This ambiguity allows us the flexibility to choose the sign of the coefficients that generates the best diffuser pattern at a new wavelength. Table III below lists the coefficients at three wavelengths: 0.45 μm, 0.55 μm, the optimized wavelength, and 0.65 μm for the best result for all possible sign permutations. The minus sign (−) indicates which coefficients $B_j$ at the optimized wavelength were given a negative value.

TABLE III

| Diffraction Order | $B_j^2$ at 0.45 μm | $B_j^2$ at 0.55 μm | $B_j^2$ at 0.65 μm |
|---|---|---|---|
| 0 | 0.0007375 | 0.0318 | 0.09963 |
| 1 | 0.07778 | 0.0320 | 0.01385 |
| 2 | 0.02465 | 0.0327(−) | 0.03487 |
| 3 | 0.03393 | 0.0337(−) | 0.03097 |
| 4 | 0.02988 | 0.0354 | 0.03537 |
| 5 | 0.03426 | 0.0375 | 0.03607 |
| 6 | 0.03800 | 0.0414(−) | 0.03855 |
| 7 | 0.03632 | 0.0439(−) | 0.04425 |
| 8 | 0.05548 | 0.0569 | 0.04943 |
| 9 | 0.05569 | 0.0569 | 0.05117 |
| 10 | 0.06731 | 0.0569 | |
| 11 | 0.02717 | 0.0569 | |
| 12 | 0.0005190 | | |
| 13 | 1.411E-6 | | |
| 14 | 9.344E-5 | | |

Figure 6:
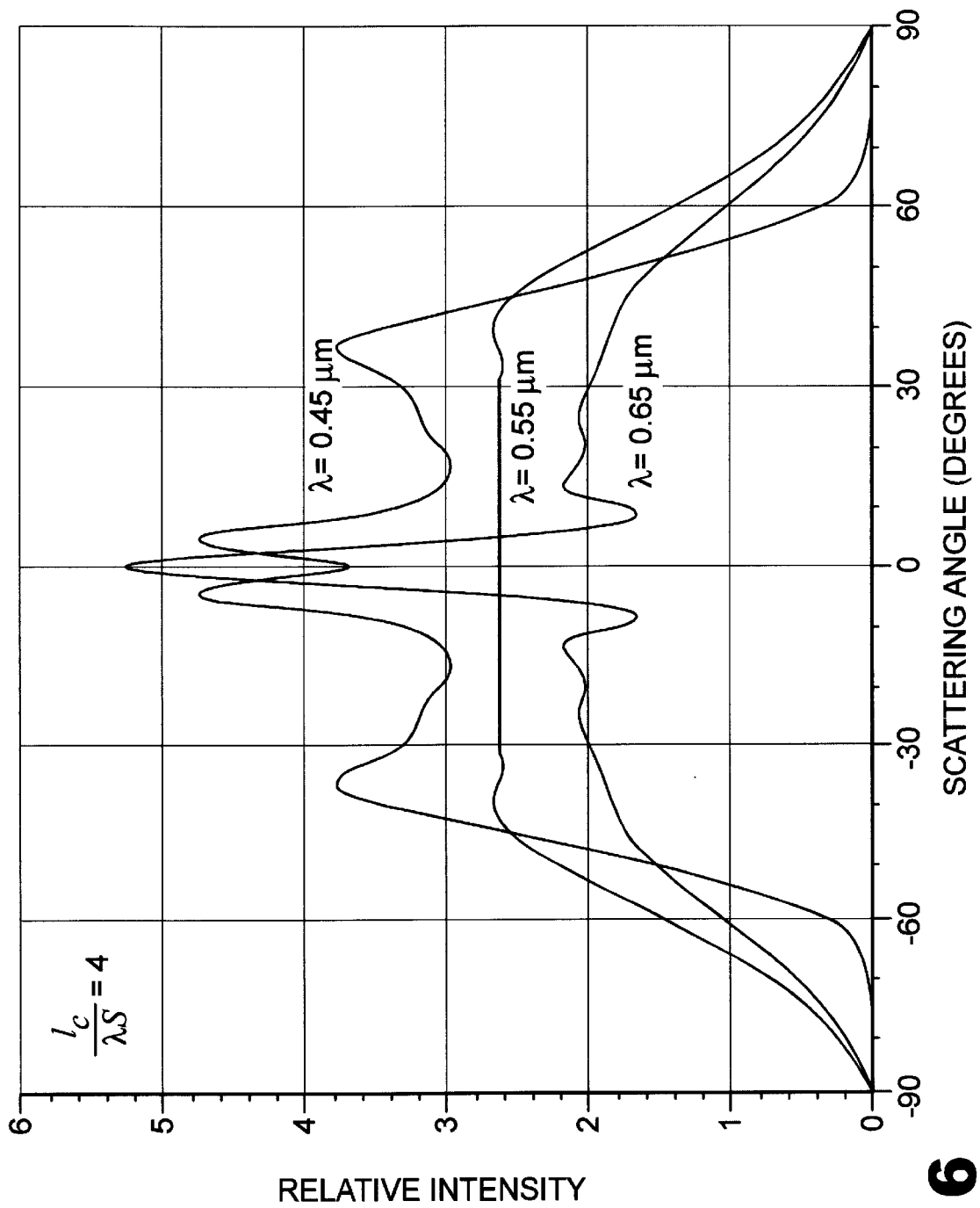
FIG. 6 is a graph illustrating the wavelength variation of the scattering pattern of the optimized sum of FIG. 5B for the combination of the diffraction grating and the diffuser.

FIG. 6 shows the resulting grating-diffuser scattering patterns at these three wavelengths, in which a significant variation from uniformity in the patterns is shown, particularly near zero degrees. It is observed that the zero-order coefficient from such an analysis varies monotonically over this wavelength range for all sign permutations. The optimized coefficient falls near the center and the other two wavelengths give relatively high or low coefficient values. The coefficients may be optimized at an extreme wavelength, 0.45 μm, for example, to provide calculated coefficients at the other wavelengths which could produce better results. The ideal values for the coefficients are shown in Table IV for the three wavelengths.

TABLE IV

| Diffraction Order | $B_j^2$ at 0.45 μm | $B_j^2$ at 0.55 μm | $B_j^2$ at 0.65 μm |
|---|---|---|---|
| 0 | 0.0260 | 0.0318 | 0.0411 |
| 1 | 0.0262 | 0.0320 | 0.0415 |
| 2 | 0.0265 | 0.0327 | 0.0426 |
| 3 | 0.0271 | 0.0337 | 0.0446 |
| 4 | 0.0278 | 0.0354 | 0.0480 |
| 5 | 0.0292 | 0.0375 | 0.0519 |
| 6 | 0.0303 | 0.0414 | 0.0627 |
| 7 | 0.0334 | 0.0439 | 0.0627 |
| 8 | 0.0337 | 0.0569 | 0.0627 |
| 9 | 0.0421 | 0.0569 | 0.0627 |
| 10 | 0.0421 | 0.0569 | |
| 11 | 0.0421 | 0.0569 | |
| 12 | 0.0421 | | |
| 13 | 0.0421 | | |
| 14 | 0.0421 | | |

As shown by the above discussion, system 10 enables a uniform intensity distribution over a wide angle from a cascade of a thin surface diffuser 18 and an appropriately matched transmission diffraction grating 14. The diffraction grating is thick relative to the thin diffuser. The expected intensity pattern for the cascade is given in Equation (28) and represents a linear combination of the individual diffuser patterns when illuminated at the grating diffraction orders. Uniformity is achieved by selecting a grating diffraction angle equal to the one-half power point of the diffuser and optimizing the strengths of the diffraction orders. Thus, the angular intensity distribution of the diffraction orders of the grating 14 when correlated with the power spectrum of the diffuser 18 provides diffused light, which is substantially uniform in intensity over an observation zone or plane within an angular range. When the cascade is illuminated at wavelengths other than the optimized wavelength(s), there may be a significant departure from uniformity.

The result for the crossed grating configuration of system 10a of FIG. 14A is similar to the result found for the single grating in Equations (28) for the parabolic diffuser surface correlation, and is given by $$\langle I_P \rangle = \pi \cos\theta \sum_{j=-M}^{M} \sum_{m=-M}^{M} B_j^2 B_m^2 \left(\frac{l_c}{\lambda S_{jm}}\right)^2 \times \quad (38)$$

$$\exp\left\{-\left(\frac{\pi l_c}{\lambda S_{jm}}\right)^2 \left[\sin^2\theta - 2\lambda\sin\theta\left(\frac{j}{\Lambda_1}\cos\phi + \frac{m}{\Lambda_2}\sin\phi\right) + \lambda^2\left(\frac{j^2}{\Lambda_1^2} + \frac{m^2}{\Lambda_2^2}\right)\right]\right\},$$

The rms phase delay is $$S_{jm} = \frac{2\pi\sigma}{\lambda}\left[\sqrt{n^2 - \lambda^2\left(\frac{j^2}{\Lambda_1^2} + \frac{m^2}{\Lambda_2^2}\right)} - \sqrt{1 - \lambda^2\left(\frac{j^2}{\Lambda_1^2} + \frac{m^2}{\Lambda_2^2}\right)}\right]. \quad (39)$$

To obtain a uniform circular symmetric intensity distribution, we optimize the coefficients $B_j^2$ and $B_m^2$ over a specified angular range $\theta$ and for all values of $\phi$.

FIG. 15A shows the optimization over a 90° angular extent. The result of Equation (38) has the added benefit of allowing us to tailor the region of uniformity. For example, as shown in FIG. 15B, we have produced an intensity distribution that is uniform over a 90° horizontal range and a 30° vertical range. Such a result is ideal for a projection screen TV or the like. Other tailored intensity distributions are also possible, as well as asymmetric intensity distributions.

Figure 15C:
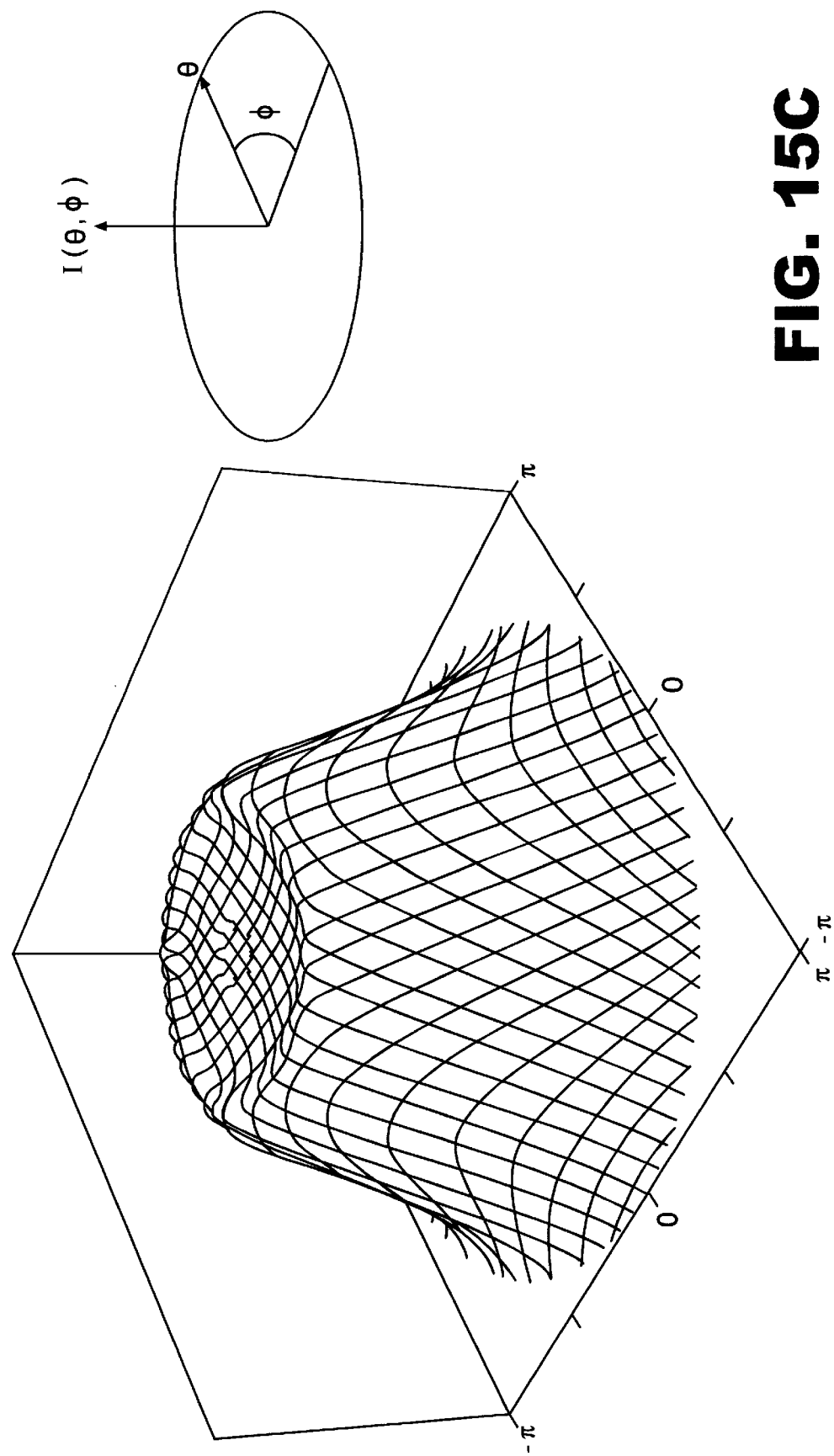
FIG. 15C is a graph illustrating the scattering pattern of the diffused light in an example of the system of FIG. 14B showing a circular symmetric pattern over a 90° span.

The result for the circular grating configuration of system 10$a$ of FIG. 14B for the parabolic diffuser surface correlation is $$\langle I_p \rangle = \pi\cos\theta\left(\frac{l_c}{\lambda S_0}\right)^2 B_0^2 \exp\left\{-\left(\frac{\pi l_c}{\lambda S_0}\right)^2 \sin^2\theta\right\} + \quad (40)$$

$$2\pi^2\cos\theta \sum_{j=1}^M B_j^2 \frac{j}{\Lambda}\left(\frac{l_c}{\lambda S_j}\right)^2 I_0\left[\left(\frac{\pi l_c}{\lambda S_j}\right)\frac{2j\lambda}{\Lambda}\sin\theta\right]$$

$$\exp\left\{-\left(\frac{\pi l_c}{\lambda S_j}\right)^2\left[\sin^2\theta + \frac{j^2\lambda^2}{\Lambda^2}\right]\right\},$$

where $I_0$ is the modified Bessel function of the first kind, order zero, and the rms phase delay, $S$, is given by Equation (30). This result is always symmetric about the z axis since it is independent of the polar angle $\phi$. This result has been optimized for a 90° uniform circular symmetric pattern shown in FIG. 15C. The result of the circular grating array in system 10$b$ of FIGS. 16A and 16B for a parabolic diffuser surface is essentially the same as the above described result for a circular grating. Furthermore, an elliptical grating, such as in an elliptical grating array, may also be used having a similar result to that of the circular grating, but providing an asymmetric intensity pattern.

EXAMPLE 1

In optical system 10, a photoresist-coated substrate may provide the grating 14 and etched glass as the diffuser 18 in this example. The technique for producing gratings is well known. The gratings were produced by spin coating a 5 cm×5 cm cover glass substrate with Shipley S1827 photoresist at 4000 rpm. This gives a 2.7 $\mu$m thick resist layer. The resist was soft baked at 95° C. for 30 min. and given an initial blanket exposure of 24 mJ/cm² of ultraviolet light. The resist was exposed to a sinusoidal fringe pattern created by the interference of two 4.5 cm diameter beams of the 457 nm line of a single frequency argon laser. The average exposure energy was 675 mJ/cm² for a fringe peak of 1.35 J/cm². This high exposure energy is required because of the decreased sensitivity of the photoresist at this wavelength and the large thickness of the resist. The beam angle determines the fringe spacing and the resulting grating spacing formed in the photoresist. After exposure, the resist was developed by spraying with Shipley 452 Developer for 6 seconds and rinsed with de-ionized water as the substrate was spun at 1000 rpm. The length of the exposure and of the development time determine the depth of the surface relief in the photoresist. For short development times the resist takes on a sinusoidal relief profile. As the development time increases, the profile becomes less sinusoidal and eventually attains a scalloped shape. The developer etches in a direction perpendicular to the local photoresist-solution interface, thus the peaks become sharper and the valleys become broader. Eventually, the pattern submerges into the resist unchanged. By controlling the length of the exposure and development the shape and depth of the profile is controlled and subsequently the strengths of the diffraction orders. A 5° grating was fabricated with the resulting diffraction order strengths in Table V, as a fraction of incident power, at three wavelengths of 0.457 $\mu$m, 0.514 $\mu$m and 0.632 $\mu$m for the orientation of FIG. 1A. It shows strong orders up to ±30°.

TABLE V

| Diffraction Order | 0.457 $\mu$m | 0.514 $\mu$m | 0.632 $\mu$m |
|---|---|---|---|
| 0 | 0.0937 | 0.129 | 0.0828 |
| 1 | 0.0351 | 0.0037 | 0.0741 |
| 2 | 0.0374 | 0.0877 | 0.158 |
| 3 | 0.0930 | 0.104 | 0.0822 |
| 4 | 0.0679 | 0.0540 | 0.283 |
| 5 | 0.0318 | 0.0204 | 0.0088 |
| 6 | 0.0126 | 0.0071 | 0.0037 |
| 7 | 0.0046 | 0.0029 | 0.0030 |
| 8 | 0.0020 | 0.0019 | 0.0057 |
| 9 | 0.0013 | 0.0013 | |
| 10 | 0.0001 | 0.0023 | |
| 11 | 0.0013 | | |

The total power throughput of the grating in this example was measured using a 10 inch diameter integrating sphere with the grating placed at a ¼ inch diameter entrance pupil. The grating was separately illuminated with a small diameter laser beam at each of the above three wavelengths. A 1 cm² photodetector was positioned at a ½ inch diameter exit pupil at 90° to the illumination and above the plane of the diffraction orders. The detected power from the grating was measured relative to the incident illumination with a beam power measurement.

For the beam power measurement the unobstructed laser beam entered the integrating sphere and a power reading was taken at an off-axis port. A baffle was positioned to prevent any first strike reflections from hitting the detector. Power throughout measurements of the grating of 74% at 0.457 $\mu$m, 78% at 0.514 $\mu$m, and 88% at 0.632 $\mu$m were obtained. The photoresist is a blue absorbing material hence the decreased transmission in the blue.

Figure 7:
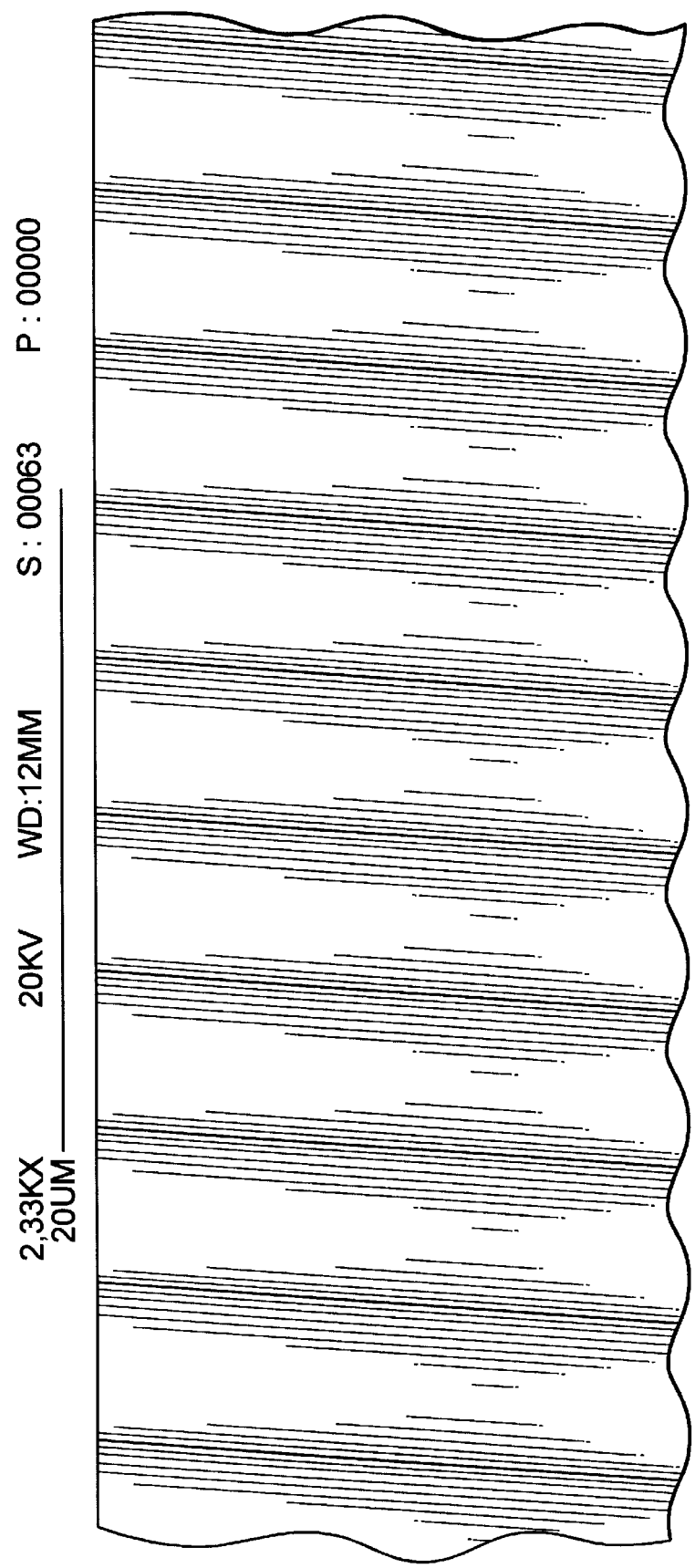
FIG. 7 is a scanning electron micrograph of a 5° grating suitable for the diffraction grating used in an example of the system of FIG. 1A.

ZYGO Nu View white light profilometer with a lateral resolution of 1.1 $\mu$m was used to profile the grating. The instrument works by forming white light fringes on the image of a surface and tracking the position of the fringes as the surface is translated vertically. The grating was determined to have a period of 5.25 $\mu$m and a height variation of 0.8 $\mu$m. The precise shape of the profile was assumed to be sinusoidal. For purposes of illustration, a scanning electron micrograph of a grating suitable for use in this example is shown in FIG. 7 and does present a sinusoidal profile. The height variation of this grating is determined to be approximately 0.76 $\mu$m.

The diffuser in this example is made from a 2"×2" cover glass exposed on one side in varying durations to different etchants. Armour Etch etching cream is used on the smooth, cleaned surface to preroughen the surface. The surface characteristics are critically dependent on the initial duration of the exposure and change significantly during the first few minutes. At an etching time with the cream of approximately 45 min., the texture of the surface does not appear to change. The preroughing produces a conical surface correlation as described earlier. The surface is then exposed to BOE (Basic Oxide Etch). Once preroughened with the cream, the BOE has the effect of smoothing out the high frequency detail of the surface. The surface is exposed to the BOE for up to 2 hours. With a 60 min. exposure to the Armour Etch, a 2 min. exposure of BOE gives an $l_c/(\lambda S)$ value of 3, 5 min. of BOE gives $l_c/(\lambda S)=3.2$, 20 min. gives $l_c/(\lambda S)=4$, 50 min. gives $l_c/(\lambda S)=5.8$, and 120 min. of BOE exposure gives $l_c/(\lambda S)=12.8$.

The diffuser has a scattering pattern that can be characterized at small angles by Equation (14) for the parabolic surface correlation. The total power throughput using the integrating sphere is 95%. For this measurement the baffle in the integrating sphere was positioned to prevent direct scattered light from the diffuser from hitting the detector.

Figure 8:
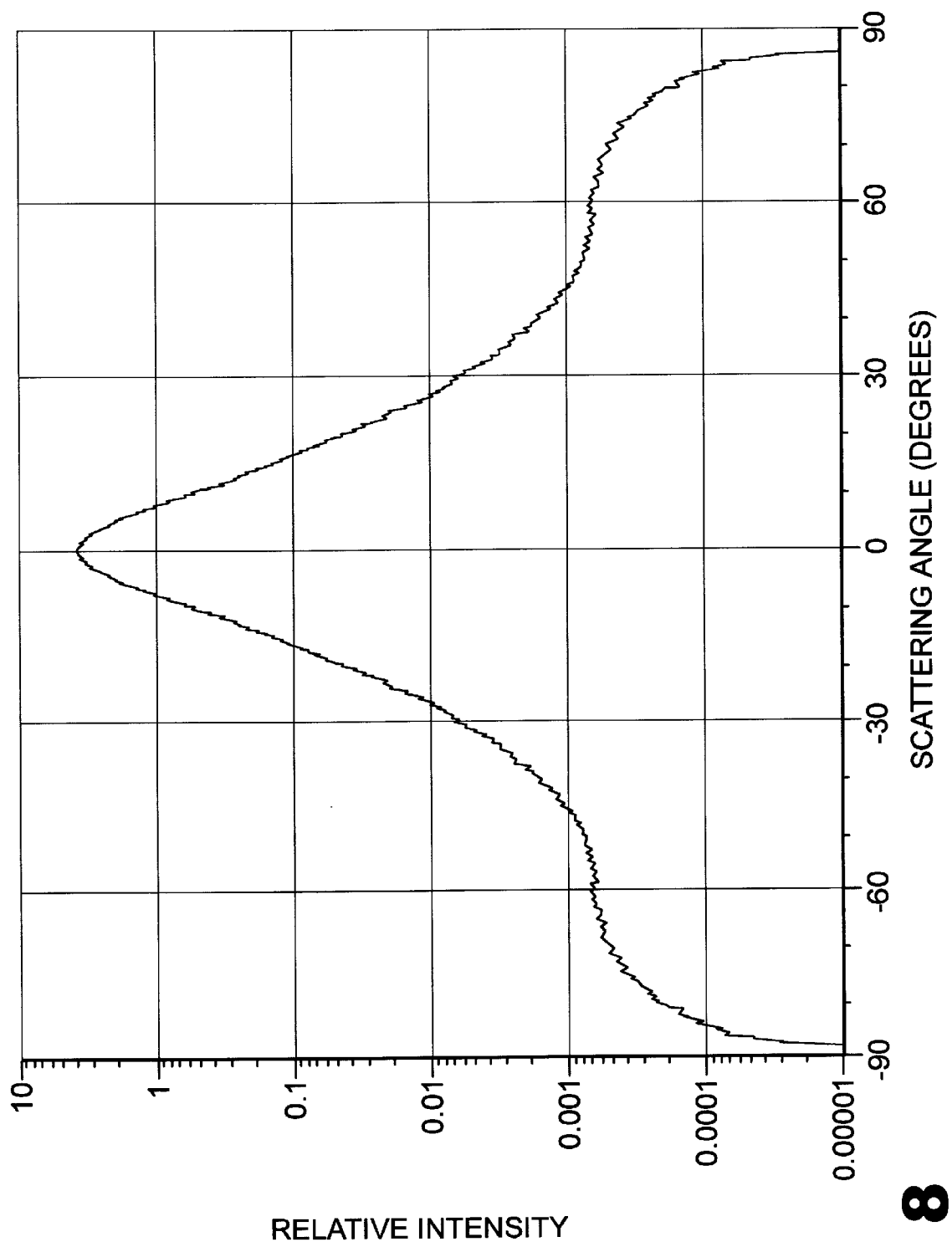
FIG. 8 is a graph illustrating the scattering pattern of the diffuser for single beam illumination in ample of the system of FIG. 1A.

The system used for the scattering pattern measurements consists of a silicon PIN photodiode operating in the photovoltaic mode mounted on an arm that swings in an arc centered at the diffuser. The incident laser illumination is polarized perpendicular to the plane of the arc and the detector contains a similarly oriented analyzer. The detector subtends an angle of 0.22° and is stepped in 0.2° increments through computer control. The laser beam from an argon ion laser is modulated with a chopper at 930 Hz and the detected signal is fed through a preamplifier and into a lock-in amplifier to provide intensity measurements over 10 orders of magnitude. The measured voltage is normalized by a reference voltage taken from a second detector in the input beam to monitor beam fluctuations. The single beam scattering pattern of the diffuser for normal incidence is shown in FIG. 8 for a wavelength of 0.514 μm. The relative intensity is plotted on a logarithmic scale and has a half-power lobe width of 11.6°. The amount of scattering at wider angles indicates that the surface also has a conical correlation component, but it is small. The roughness parameter, $l_c/(\lambda s)$, is found to be 2.6. For comparison to the incident power level, an undisturbed laser beam signal for this system is 2300. This applies to all the data plots.

Figure 9:
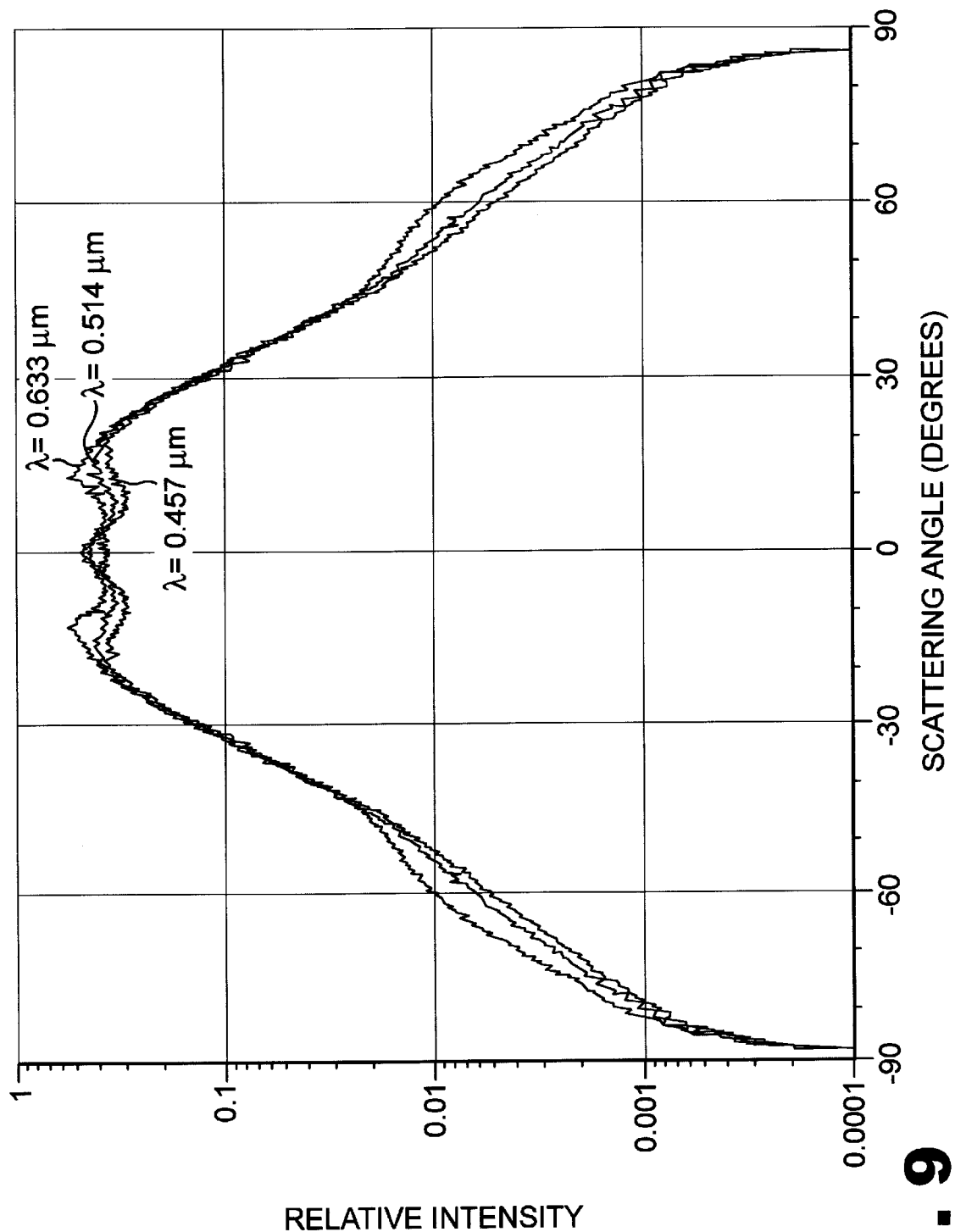
FIG. 9 is a graph illustrating the scattering pattern of the diffused light in the example of the system of FIG. 1A for multiple wavelengths with a 5° diffraction grating and a diffuser, as measured in the plane of the grating diffraction orders.
Figure 10:
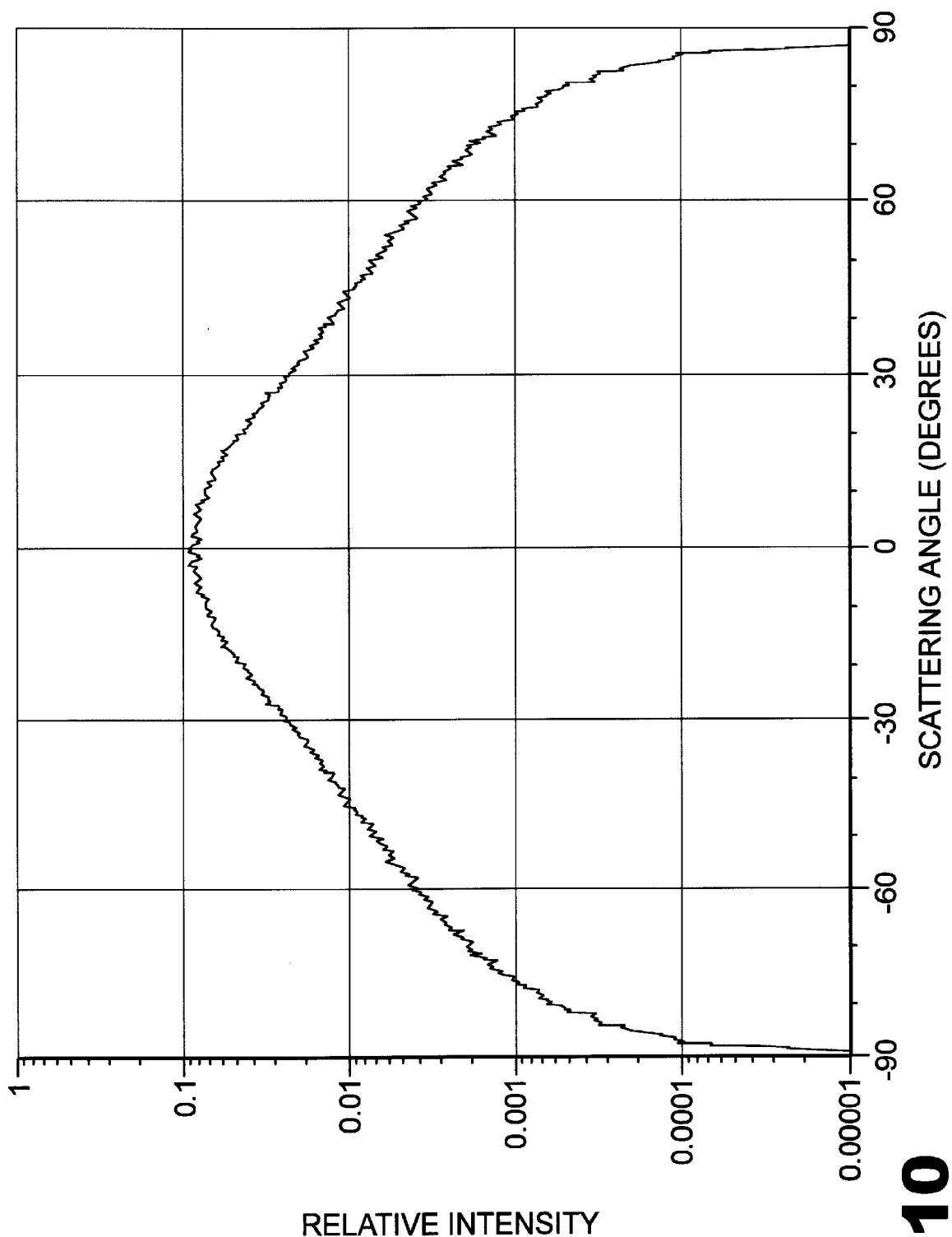
FIG. 10 is a graph illustrating the scattering pattern for a commercially available microfiche view screen.

The 5° grating and the diffuser of this example were cascaded as in FIG. 1A and the radiation pattern in the plane of the diffraction orders was measured. The result in FIG. 9 shows substantial uniformity over a 40° span and at all three wavelengths. The power throughput for the cascade ranges from 67% at 0.457 μm and 0.514 μm to 77% at 0.632 μm. This can be compared to a commercially available microfiche viewer screen shown in FIG. 10 which has a symmetric distribution and a total power throughput of about 55% for blue and green and 45% for red. The screen is in fact blue accounting for the reduced transmission in red.

EXAMPLE 2

Figure 11A:
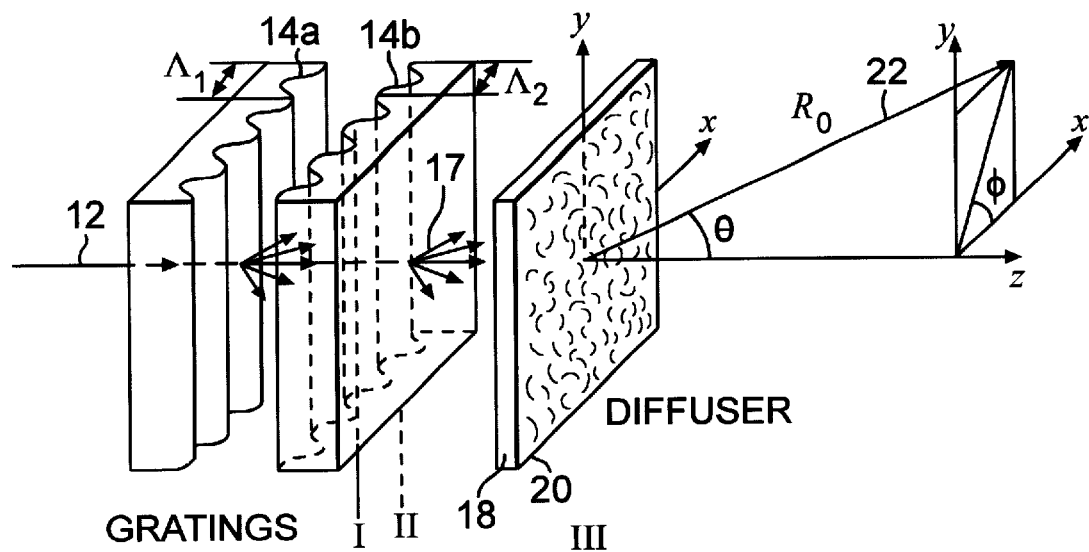
FIG. 11A is an optical diagram of another embodiment of the system of the present invention having two diffraction gratings and a diffuser.
Figure 11B:
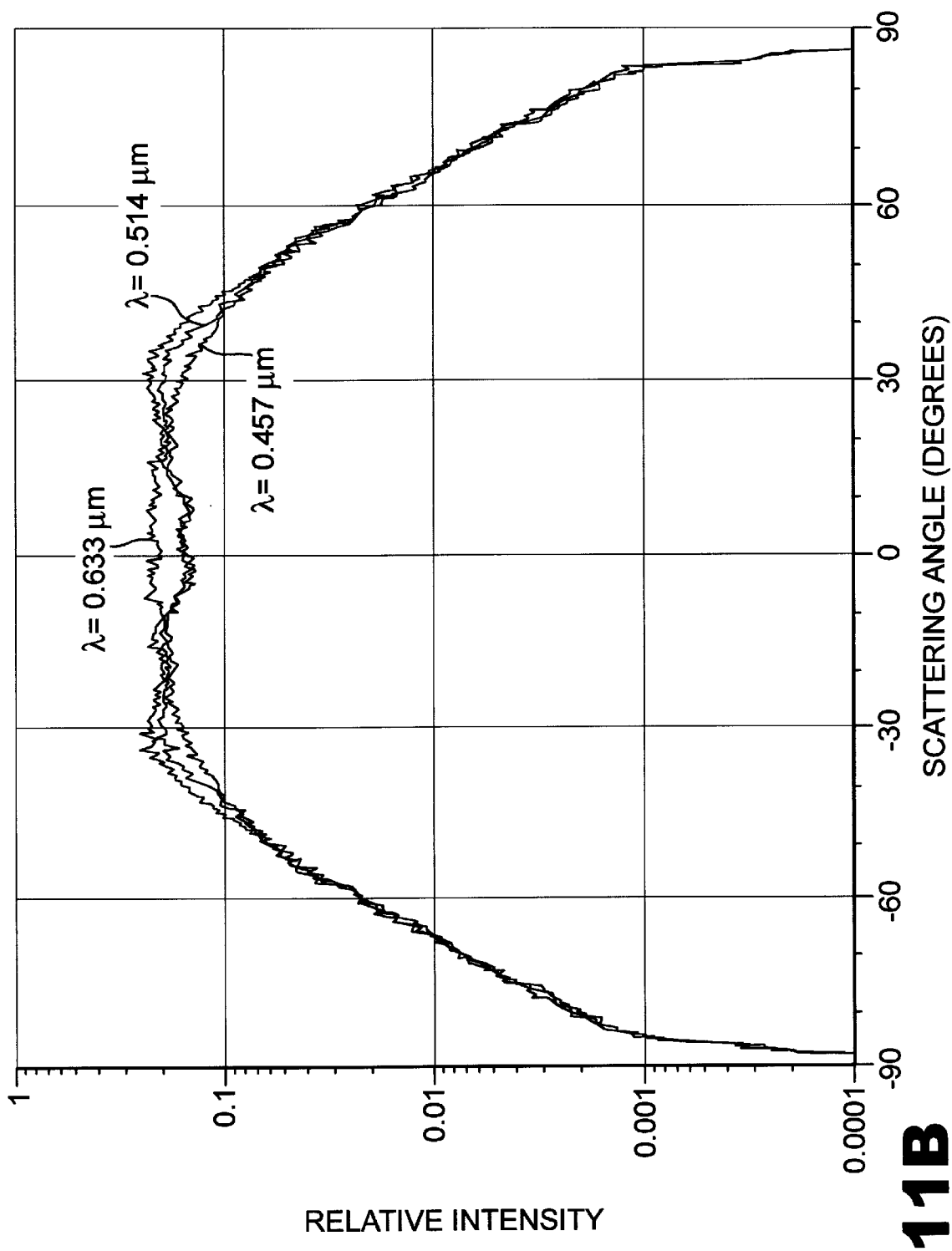
FIG. 11B is a graph illustrating the scattering pattern of the diffused light in multiple wavelengths in an example of the system of FIG. 11A having a 5° grating, a 15° grating, and a diffuser, as measured in the plane of the grating diffraction orders.

The optimum diffraction orders provided by the diffraction grating 14 in system 10 may be provided by more than one diffractive element, such as shown for example in the system 28 of FIG. 11A. Multiple diffraction gratings can be used to provide additional diffraction orders to the diffuser or when it is difficult to fabricate a single grating having the desired number of orders at the desired multiple wavelengths, such as more than 5 or 6 optimum orders at three wavelengths. System 28 operates the same as system 10 except that two diffraction gratings 14a and 14b are used with diffuser 18, instead of a single diffraction grating. Diffraction gratings 14a and 14b may be on different optical elements or two surfaces of the same optical element. In this example, a second grating 14b with a 15° diffraction angle is added to the system of the previous example, where grating 14a is a 5° grating oriented as the grating shown in FIG. 1A, and grating 14b and diffuser are oriented as shown in FIG. 1B. The second grating 14b effectively replicates the orders of the 5° grating 14a at the larger angles. FIG. 11B shows the scattering pattern produced by system 28 having a substantially flat (i.e., uniform) pattern over an 80° range at all three wavelengths.

Thus, as shown by these examples, the systems 10 and 28 can provide for the diffusing of light with a uniform intensity pattern and no color effects, such as color banding. In particular, a cascade of grating 14 and diffuser 18 having the performance illustrated in FIGS. 9 and 11B (i.e., a uniform intensity distribution over a wide angular range of 80° at multiple wavelengths) is applicable to a projection TV screen, display screen (such as a computer CRT or LCD), or the like, or for general purpose illumination. Controlled lighting situations other than uniform are also possible by altering the strengths of the grating diffraction orders as desired. The above examples are illustrative of the optical system for diffusing light shown in FIGS. 1A, 1B, and 1C, and FIG. 11A. Other combinations of diffractive and diffusing elements having the desired optimum diffractive orders and diffusing characteristics may also be used.

From the foregoing description, it will be apparent that there has been provided an improved optical system for diffusing light. Variations and modifications in the herein described system in accordance with the invention will undoubtedly suggest themselves to those skilled in the art. For example, the optical system may be used for diffusing electromagnetic signals other than visible light, such as in the spectrum of radio signals through microwave, sub-mm, infrared, ultraviolet and x-ray, by optimizing the system for wavelengths or wavelengths of such signals. Accordingly, the foregoing description should be taken as illustrative and not in a limiting sense.

What is claimed is:

1. An optical system for diffusing illumination projected from a television or a display screen to provide said diffused illumination uniformly over an angle exceeding 45 degrees in at least one direction comprising:
    a diffractive element for diffracting said projected illumination to provide diffracted light; and
    a diffusing element which diffuses said diffracted light, in which the diffractive element provides said diffracted light having a diffraction period, wherein said diffractive element diffracts light in a plurality of diffraction orders, said diffusing element has a power spectrum having an angular width, and said diffraction period of said diffractive element provides an angular separation between a zeroeth of the diffraction orders and first of the diffraction orders approximately equal to one-half the angular width of the power spectrum of said diffusing element.

2. The system according to claim 1 wherein said diffractive element and said diffusing element are integrated on either side of a sheet transmissive to said illumination.

3. The system according to claim 1 wherein said diffused diffractive light has a predetermined intensity of the diffused illumination at a viewing plane.

4. The system according to claim 1 wherein said diffracted light represents an intensity distribution of light in accordance with said diffraction orders, said diffusing element diffuses light from each of said diffraction orders, and the combination of the diffused light from each said diffraction order provides a substantially uniform intensity distribution of diffused light over said angle.

5. The system according to claim 1 wherein said diffractive element is a diffraction grating.

6. The system according to claim 1 wherein said diffractive element represents a diffraction grating profile which is generally cylindrical.

7. The optical system according to claim 1 wherein said diffractive element has a structure selected from the group consisting of an array of circular gratings, an array of elliptical gratings, or a crossed-grating.

8. An optical system for diffusing light received by the system, said system comprising:
   first means for diffracting the illumination to provide a plurality of diffraction angular orders; and
   second means for diffusing the diffracted illumination at one or more of the diffraction angular orders in which said first means has a diffraction period, wherein said second means has a power spectrum having an angular width, and said diffraction period of said first means provides an angular separation between a zeroeth of the diffraction orders and first of the diffraction orders approximately equal to one-half the angular width of the power spectrum of said second means.

9. A light diffusing medium for a window, skylight, screen, light bulb, or light tube comprising:
   a first optical surface providing a diffractive element which diffracts light received by said medium;
   a second optical surface providing a diffusing element which diffuses light diffracted from said first optical layer, in which said diffractive element has a diffraction period, wherein said diffractive element diffracts light in a plurality of diffraction orders, said diffusing element has a power spectrum having an angular width, and said diffraction period of said diffractive element provides an angular separation between a zeroeth of the diffraction orders and first of the diffraction orders approximately equal to one-half the angular width of the power spectrum of said diffusing element.

10. An optical system for diffusing light received by the system, said system comprising:
    a first optical element for diffracting light received by the system in a plurality of diffraction orders; and
    a second optical element which diffuses the diffracted light from said first optical element in accordance with said diffraction orders to provide diffused light, wherein said second optical element is a diffuser which has a power spectrum related to the angle of irradiance of light thereon, said power spectrum having an angular width, and said first optical element has a diffraction period which provides an angular separation between a zeroeth of the diffraction orders and first of the diffraction orders approximately equal to one-half the angular width of the power spectrum of the diffuser.

11. An optical system for diffusing light received by the system, said system comprising:
    a first optical element for diffracting light received by the system; and
    a second optical element which diffuses the diffracted light from said first optical element to provide diffused light, in which said second optical element has a power spectrum, and said first optical element has a diffraction period selected in accordance with said power spectrum of said second optical element, wherein said first optical element is a diffractive element which diffracts light received by the system in a plurality of diffraction orders, said power spectrum of said second optical element has an angular width, and said diffraction period of said first optical element provides an angular separation between a zeroeth of the diffraction orders and first of the diffraction orders approximately equal to one-half the angular width of the power spectrum of said second optical element.

12. The system according to claim 11 wherein said system provides a certain illumination distribution in accordance with the selected diffraction period of said first optical element and said power spectrum of said second optical element.

13. The system according to claim 11 wherein the strengths of said diffraction orders of said first optical element are selected to obtain uniformity of the intensity distribution of the light from the second optical element.

14. The system according to claim 11 wherein said diffraction period represents a periodic phase modulation.

15. The system according to claim 11 wherein said diffracted light represents an intensity distribution of light in accordance with said diffraction orders, said second optical element diffuses light from each said diffraction order, and the combination of the diffused light from each said diffraction order provides a predetermined intensity distribution of said diffracted light from said second optical element.

16. The system according to claim 15 wherein the diffused light from each of said diffraction orders contribute to said predetermined intensity distribution to provide a substantially uniform intensity distribution of diffused light over an angular range.

17. The system according to claim 15 wherein said intensity distribution of the diffracted light in the far field is a superposition of the individual intensity distributions from the second optical element when illuminated with said angular intensity distribution weighted by the strengths of the diffracted light for each of the diffraction orders.

18. The system according to claim 11 wherein said diffused light from said second optical element has a substantially uniform intensity distribution over a wide angle greater than 45 degrees.

19. The system according to claim 18 wherein said wide angle is approximately 90 degrees.

20. The system according to claim 11 wherein said diffractive element of said first optical element faces said second optical element.

21. The system according to claim 11 wherein said diffractive element of said first optical element faces away from said second optical element.

22. The system according to claim 11 wherein said first optical element and said second optical element are spaced a distance from each other.

23. The system according to claim 11 wherein said first optical element and said second optical element are integrated on a single body.

24. The system according to claim 11 wherein said first optical element has a surface providing a diffraction grating, and said second optical element has a surface to diffuse light received from said first optical element.

25. The system according to claim 11 wherein said first optical element is a diffraction grating.

26. The system according to claim 25 wherein said diffraction grating represents one of a holographic diffraction grating and a surface relief diffraction grating.

27. The system according to claim 25 wherein said diffraction grating having one of a cylindrical structure and a circular symmetric structure.

28. The system according to claim 25 wherein said grating is one of a one-dimensional and two-dimensional grating.

29. The system according to claim 25 wherein said grating has a structure representing one of a crossed grating and a circular grating.

30. The system according to claim 25 wherein said grating has a structure representing an array of circular gratings.

31. The system according to claim 25 wherein said grating has a structure representing an array of elliptical gratings.

32. The system according to claim 11 wherein said second optical element is a parabolic diffuser.

33. The system according to claim 11 wherein said second optical element is substantially thinner with respect to said first optical element.

34. The system according to claim 11 wherein said second optical element has a small angle scattering pattern.

35. The system according to claim 11 wherein said first and second optical elements are part of a window.

36. The system according to claim 11 wherein said first and second optical elements are part of a skylight.

37. The system according to claim 11 wherein said first and second optical elements represent an envelope of a light bulb or tube.

38. The system according to claim 11 wherein said first and second optical elements are part of a projection television.

39. The system according to claim 11 wherein said first and second optical elements are part of a display screen.

40. The system according to claim 11 wherein said first optical element represents a plurality of optical elements, and said diffractive element represents a plurality of diffractive elements on said plurality of optical elements, in which said plurality of diffractive elements provides said plurality of diffraction orders.

41. The system according to claim 11 further comprising at least one light source for providing light to said first optical element.

42. The system according to claim 41 wherein said light from said light source has a plurality of wavelengths.

43. The system according to claim 41 wherein said light from said light source is monochromatic.

44. The system according to claim 41 wherein said light provided to said first optical element is received through said second optical element and reflected and diffracted by said first optical element to said second optical element.

45. The optical system according to claim 11 wherein said first optical element has first and second sides in which said second side faces said second optical element, and said optical system further comprising an image transparency adjacent said first side of the first optical element.

46. A method for diffusing light from one or more light sources for improving illumination of an area comprising the steps of:

diffracting the light to provide a plurality of diffraction angular orders having an angular separation;

diffusing the diffracted light in accordance with a power spectrum of diffusion at one or more of the diffraction angular orders in which said angular separation is selected in accordance with the power spectrum; and illuminating an area with said diffused light, wherein said angular separation between a zeroeth of the diffraction angular orders and first of the diffraction angular orders is approximately equal to one-half the angular width of the power spectrum.

47. The method according to claim 46 wherein the strengths of said diffraction angular orders are selected to obtain uniformity of the intensity distribution of said diffused light.

48. The method according to claim 46 wherein said diffracted light represents an intensity distribution of light in accordance with said diffraction angular orders, said diffusing step diffuses light from each said diffraction order, and the combination of the diffused light from each said diffraction order provides a predetermined intensity distribution of said diffracted light.

49. The method according to claim 48 wherein the diffused light from each of said diffraction angular orders contribute to said predetermined intensity distribution to provide a substantially uniform intensity distribution of diffused light over an angular range.

50. The method according to claim 46 wherein said diffused light has a substantially uniform intensity distribution over a wide angle greater than 45 degrees.

51. The method according to claim 46 wherein said diffusing step diffuses light with a small angle scattering pattern.

52. The method according to claim 46 further comprising the step of providing at least one light source for light to said diffracting step.

53. The method according to claim 52 wherein said light source is sunlight.

54. The system according to claim 25 wherein said grating is a one-dimensional grating.

55. The system according to claim 41 wherein said light from said light source is first incident said first optical element of the group of said first and second optical elements.

56. The system according to claim 41 wherein said light from said light source is sunlight.

57. An optical system for diffusing light comprising:

a first optical element for diffracting light, and a second optical element for diffusing light having a parabolic surface correlation, in which said first and second optical elements are in a cascade relationship providing an intensity distribution $I_p$ from light received by the system in accordance with $$\langle I_p \rangle = \pi\cos\theta \sum_{j=-M}^{M} \left(B_j^2\left(\frac{l_c}{\lambda S_j}\right)\right)^2 \exp\left\{-\left(\frac{\pi l_c}{\lambda S_j}\right)^2 \left[\sin^2\theta - \frac{2j\lambda}{\Lambda}\sin\theta\cos\phi - \left(\frac{j\lambda}{\Lambda}\right)^2\right]\right\}$$

wherein $\theta$ and $\phi$ are the scattering angles of the light received by the system, $\lambda$ is the wavelength of light, $l_c$ is the surface correlation length of the second optical element, and S is the rms phase delay of the second optical element in accordance with $$S_j = \frac{2\pi\sigma}{\lambda}\left[\sqrt{n^2 - \left(\frac{j\lambda}{\Lambda}\right)^2} - \sqrt{1 - \left(\frac{j\lambda}{\Lambda}\right)^2}\right]$$

wherein $\sigma$ is the rms surface height, $\Lambda$ is the grating period of the first optical element based upon the full-width-at-half-maximum of the power spectrum of the second optical element, n is the refractive index of the second optical element, and variable j represents a diffraction order of the first optical element, $B_j^2$ are the strength values of the diffraction orders of the first optical element, in which said strength values are optimized to obtain a power spectrum of the light from the system which is substantially uniform over an angular range.

58. The optical system according to claim 57 wherein the angle of the first diffraction order of the first optical element is near the angle at which the power spectrum of the second optical element is approximately one half the peak value of the power spectrum, and said diffraction period is in accordance with the angle of first diffraction order.

59. The optical system according to claim 57 wherein said full-width-at-half-maximum of the power spectrum of the second optical element is in accordance with $l_c/\lambda S$.

* * * * *

UNITED STATES PATENT AND TRADEMARK OFFICE
CERTIFICATE OF CORRECTION

PATENT NO. : 6,259,561 B1
DATED : July 10, 2001
INVENTOR(S) : George et al.

It is certified that error appears in the above-identified patent and that said Letters Patent is hereby corrected as shown below:

Column 1,
Line 1, under the title, insert the following paragraph:

-- The U.S. Government may have rights in this patent pursuant to the following contract between the Department of the Army and The University of Rochester under Grant No. DAAG55-97-1-00350. --

Signed and Sealed this

Twenty-ninth Day of June, 2004

JON W. DUDAS
*Acting Director of the United States Patent and Trademark Office*